(12) United States Patent
Geng et al.

(10) Patent No.: US 12,507,140 B2
(45) Date of Patent: Dec. 23, 2025

(54) COMMUNICATION METHOD AND APPARATUS

(71) Applicant: Huawei Technologies Co., Ltd., Shenzhen (CN)

(72) Inventors: Tingting Geng, Shanghai (CN); Xingxing Hu, Shanghai (CN); Hongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 490 days.

(21) Appl. No.: 17/670,761

(22) Filed: Feb. 14, 2022

(65) Prior Publication Data

US 2022/0167235 A1    May 26, 2022

Related U.S. Application Data

(63) Continuation of application No. PCT/CN2020/109006, filed on Aug. 13, 2020.

(30) Foreign Application Priority Data

Aug. 15, 2019 (CN) .......................... 201910755236.9

(51) Int. Cl.
  *H04W 36/00* (2009.01)
  *H04W 36/30* (2009.01)
  (Continued)

(52) U.S. Cl.
  CPC ..... *H04W 36/00837* (2018.08); *H04W 36/00* (2013.01); *H04W 36/0083* (2013.01);
  (Continued)

(58) Field of Classification Search
  None
  See application file for complete search history.

(56) References Cited

U.S. PATENT DOCUMENTS

2014/0099955 A1* 4/2014 Nukala ............... H04W 36/36
                                                         455/436
2016/0302119 A1* 10/2016 Chen .................... H04W 76/14
                         (Continued)

FOREIGN PATENT DOCUMENTS

CN    104202780 A    12/2014
CN    108632926 A    10/2018
                (Continued)

OTHER PUBLICATIONS

"Conditional SN Addition for Fast Connection," Source: CATT, Agenda Item: 11.10.4.4, Document for: Discussion and Decision, 3GPP TSG-RAN WG2 Meeting #106, R2-1906919 (Resubmission of R2-1903327), Reno, USA, May 13-17, 2019, 4 pages.

(Continued)

*Primary Examiner* — Jay L Vogel
(74) *Attorney, Agent, or Firm* — SLATER MATSIL, LLP

(57) ABSTRACT

A communication method and apparatus, the method including obtaining, by a master access network device, handover triggering condition information of one or more cells corresponding to at least one candidate secondary access network device, sending a first message to a terminal device, where the first message comprises the handover triggering condition information, and receiving a first response message from the terminal device, where the first response message is used to indicate a cell identifier of a second cell corresponding to a second secondary access network device in the at least one candidate secondary access network device, and the second cell meets a handover triggering condition indicated by handover triggering condition information of the second cell.

17 Claims, 12 Drawing Sheets

(51) Int. Cl.
*H04W 76/15* (2018.01)
*H04W 76/27* (2018.01)

(52) U.S. Cl.
CPC ..... *H04W 36/0085* (2018.08); *H04W 36/302* (2023.05); *H04W 76/27* (2018.02); *H04W 36/00698* (2023.05); *H04W 76/15* (2018.02)

(56) References Cited

U.S. PATENT DOCUMENTS

| | | | |
|---|---|---|---|
| 2017/0041940 A1* | 2/2017 | Falconetti | H04L 5/006 |
| 2019/0223073 A1 | 7/2019 | Chen et al. | |
| 2019/0297537 A1* | 9/2019 | Tsai | H04W 76/27 |
| 2019/0394826 A1* | 12/2019 | Wang | H04W 76/19 |
| 2020/0022055 A1 | 1/2020 | Yan et al. | |
| 2020/0281023 A1 | 9/2020 | Yan et al. | |
| 2020/0374893 A1* | 11/2020 | Toeda | H04W 76/15 |
| 2021/0014865 A1 | 1/2021 | Zheng et al. | |
| 2022/0167233 A1* | 5/2022 | Shi | H04W 36/0061 |

FOREIGN PATENT DOCUMENTS

| | | | |
|---|---|---|---|
| CN | 109803398 A | 5/2019 | |
| CN | 110290530 A | 9/2019 | |
| WO | WO-2018171739 A1 * | 9/2018 | ........ H04W 36/0016 |
| WO | WO-2018194326 A1 * | 10/2018 | ............ H04W 36/00 |
| WO | 2019148677 A1 | 8/2019 | |

OTHER PUBLICATIONS

"Report of e-mail [100#31][NR] Inter-Node RRC Message," Agenda Item: 10.4.3.4, Source: Samsung, Document for: Discussion and decision, 3GPP TSG-RAN WG2 NR AH meeting, Tdoc, R2-1800845, Vancouver, Canada, Jan. 22-26, 2017, 32 pages.

"Reuse of Conditional Handover for SCG Change in NR-DC," Agenda item: 11.9.3.3, Other (Handover robustness improvements), Source: NEC, Document for: Discussion and Decision, 3GPP TSG-RAN WG2 #106, R2-1906754, (revision of R2-1904069), Reno, USA, May 13-17, 2019, 3 pages.

"Baseline CR for TS 37.340 covering agreements of RAN3#AH1807," Source to WG: ZTE, Source to TSG: RAN3, Work item code: NR_newRAT-Core, Date: 2018-08-10, Category: F, Release: Rel-15, Change Request 37.340, CR Draft, rev 1, Current version: 15.2.0, 3GPP TSG-RAN WG3 #101, R3-184512, Gothenburg, Sweden, Aug. 20-24, 2018, 55 pages.

* cited by examiner

COMMUNICATION METHOD AND APPARATUS

CROSS-REFERENCE TO RELATED APPLICATIONS

This application is a continuation of International Application No. PCT/CN2020/109006, filed on Aug. 13, 2020, which claims priority to Chinese Patent Application No. 201910755236.9, filed on Aug. 15, 2019. The disclosures of the aforementioned applications are hereby incorporated by reference in their entireties.

TECHNICAL FIELD

This application relates to the communication field, and more specifically, to a communication method and apparatus.

BACKGROUND

In a conventional mobile communication system, mobility management of a terminal device in a connected mode is controlled by a network device, in other words, the network device indicates, by sending a handover message, a cell to which the terminal device is handed over and how to perform handover.

Specifically, a source network device sends the handover message to the terminal device, to control the terminal device to be handed over from a source cell to a target cell. After receiving the handover message, the terminal device accesses the target cell based on content included in the handover message. Therefore, successful sending of the handover message is a necessary condition of ensuring successful handover in a conventional handover mechanism. However, in a long term evolution (LTE) system or a new radio (NR) system, fast attenuation of channel quality, fast movement of a terminal device, obstruction of an object, relatively long duration of measurement and handover preparation, or the like may lead to a failure in sending the handover message. Consequently, a handover failure is caused, and a handover success rate is relatively low.

Particularly, in a dual connectivity (DC) scenario, a terminal device can communicate with two network devices at the same time. How to perform cell handover to improve a success rate of cell handover needs to be urgently resolved.

SUMMARY

This application provides a communication method, a communication apparatus, a communication system, and a readable storage medium, to improve a success rate of cell handover.

According to a first aspect, a communication method is provided. The method may be applied to a communication system including a master access network device and a first secondary access network device, and the method includes obtaining handover triggering condition information of one or more cells corresponding to at least one candidate secondary access network device, and sending a first message to a terminal device, where the first message includes the handover triggering condition information.

The master access network device receives, from the first secondary access network device, the handover triggering condition information of the one or more cells corresponding to the at least one candidate secondary access network device, and sends, to the terminal device, the first message including the handover triggering condition information of the one or more cells corresponding to the at least one candidate secondary access network device, so that the terminal device can actively perform, based on the handover triggering condition information, handover to a cell corresponding to a secondary access network device. Therefore, a success rate of cell handover is improved. In addition, a speed of performing changing (change) to the cell corresponding to the secondary access network device is increased, and flexibility of performing changing to the cell corresponding to the secondary access network device is improved.

In some possible implementations, the obtaining handover triggering condition information of one or more cells corresponding to at least one candidate secondary access network device includes receiving the handover triggering condition information from the first secondary access network device.

The first secondary access network device may obtain, through detection, the handover triggering condition information of the one or more cells corresponding to the at least one candidate secondary access network device, and send the handover triggering condition information of the one or more cells corresponding to the at least one candidate secondary access network device to the master access network device. That is, the first secondary access network device may flexibly adjust the handover triggering condition information, so that flexibility of performing changing to the cell corresponding to the secondary access network device is improved.

In some possible implementations, the obtaining handover triggering condition information of one or more cells corresponding to at least one candidate secondary access network device includes generating the handover triggering condition information.

The master access network device may set the handover triggering condition information of the one or more cells corresponding to the at least one candidate secondary access network device. For example, the master access network device is a master node (MN), and the first secondary access network device is a secondary node (SN). The MN sets the handover triggering condition information based on a candidate SN list that is obtained from the SN and measurement result information (where the measurement result information is also optional), that is, the MN determines the handover triggering condition information. Therefore, flexibility of SN change is improved.

In some possible implementations, the method further includes receiving, from the first secondary access network device, measurement quality information of the one or more cells corresponding to the at least one candidate secondary access network device, receiving configuration information of one or more cells corresponding to a first candidate access network device from a first candidate secondary access network device in the at least one candidate secondary access network device, and the sending a first message to a terminal device includes sending the first message to the terminal device, where the first message further includes at least one of a cell identifier, configuration information, and the measurement quality information that are of the one or more cells corresponding to the at least one candidate secondary access network device.

Configuration information of a first cell in the one or more cells may be at least one of a time-frequency resource allocated to the terminal device by a candidate secondary access network device to which the first cell belongs, a radio resource control configuration (RRC configuration) of the first cell, measurement quality of the first cell, or an address of the candidate secondary access network device to which the first cell belongs, so that communication quality after the terminal device is handed over to the access network device to which the first cell belongs is improved.

In some possible implementations, before configuration information of a first cell is received, the method further includes sending a first request to the first candidate secondary access network device, where the first request is used to request the configuration information configured by the first candidate secondary access network device for the terminal device.

In other words, after receiving the first request, the first candidate secondary access network device sends the configuration information to the master access network device, so that a signaling waste caused by sending the configuration information without a requirement is avoided.

In some possible implementations, handover triggering condition information of a first cell corresponding to the at least one candidate secondary access network device is used to indicate one or more of a valid time of the handover triggering condition information of the first cell, a handover triggering condition of the first cell, and a priority of the first cell, where the handover triggering condition of the first cell includes a measurement quality threshold for triggering the terminal device to be handed over to the first cell or a quality deviation threshold for triggering the terminal device to be handed over to the first cell, and a quality deviation includes a difference between measurement quality of a channel between the terminal device and a serving cell and measurement quality of a channel between the terminal device and the first cell.

Restricting selection of a handover cell in the foregoing manner may further improve communication quality after handover or improve flexibility of cell handover.

In some possible implementations, the method further includes receiving a first response message from the terminal device, where the first response message is used to indicate a cell identifier of a second cell corresponding to a second secondary access network device in the at least one candidate secondary access network device, and the second cell meets a handover triggering condition indicated by handover triggering condition information of the second cell.

The MN may learn, from the terminal device, of a cell identifier of a cell to which the terminal device is to be handed over and that is selected by the terminal device. Therefore, the MN and a first SN do not perform dual connectivity communication with the terminal device at the same time, to help improve communication efficiency.

In some possible implementations, the method further includes sending a second message to the first secondary access network device, where the second message is used to indicate a status of adding a candidate secondary access network device by the master access network device.

The addition status may be that the master access network device successfully or unsuccessfully adds the candidate secondary access network device. The first secondary access network device may learn of the addition status of the candidate secondary access network device based on the second message. This helps the secondary access network device select a more appropriate candidate secondary access network device for the primary access network, to further improve a handover success rate.

In some possible implementations, the second message includes acknowledgement information of a candidate secondary access network device successfully added by the master access network device, and/or information about a candidate secondary access network device unsuccessfully added by the master access network device.

The addition status is learned more concisely by using acknowledgement (ACK) information or negative acknowledgement (NACK) information, to reduce signaling transmission overheads and reduce identification overheads of the first secondary access network device.

According to a second aspect, a communication method is provided. The method may be applied to a communication system including a master access network device and a first secondary access network device, and the method includes determining handover triggering condition information of one or more cells corresponding to at least one candidate secondary access network device, and sending the handover triggering condition information to the master access network device.

The first secondary access network device may determine handover triggering condition information of one or more cells corresponding to each of the at least one candidate secondary access network device, and send the handover triggering condition information to the master access network device. Further, the master access network device sends, to the terminal device, a first message including the handover triggering condition information of the one or more cells corresponding to the at least one candidate secondary access network device, so that the terminal device can actively perform, based on the handover triggering condition information, handover to a cell corresponding to a secondary access network device. Therefore, a success rate of cell handover is improved, a speed of SN change is increased, and flexibility of SN change is improved.

In some possible implementations, handover triggering condition information of a first cell corresponding to the at least one candidate secondary access network device is used to indicate one or more of a valid time of the handover triggering condition information of the first cell, a handover triggering condition of the first cell, and a priority of the first cell, where the handover triggering condition of the first cell includes a measurement quality threshold for triggering the terminal device to be handed over to the first cell or a quality deviation threshold for triggering the terminal device to be handed over to the first cell, and a quality deviation includes a difference between measurement quality of a channel between the terminal device and a serving cell and measurement quality of a channel between the terminal device and the first cell.

Restricting selection of a handover cell in the foregoing manner may further improve communication quality after handover or improve flexibility of cell handover.

In some possible implementations, the method further includes sending, to the master access network device, measurement quality information of the one or more cells corresponding to the at least one candidate secondary access network device.

The first secondary access network device sends the measurement quality information of the one or more cells corresponding to the at least one candidate secondary access network device to the master access network device. Therefore, the master access network device adds the measurement quality information of the one or more cells corresponding to the at least one candidate secondary access network device to the first message and sends the first message to the terminal device, so that the terminal device selects a second cell based on the measurement quality information, to further improve the communication quality of a cell after handover.

In some possible implementations, the method further includes receiving a second message from the master access network device, where the second message is used to indicate a status of adding the at least one candidate secondary access network device by the master access network device.

The addition status may be that the master access network device successfully or unsuccessfully adds the candidate secondary access network device. The first secondary access network device may learn of the addition status of the candidate secondary access network device based on the second message. This helps the secondary access network device select a more appropriate candidate secondary access network device for the primary access network, to further improve a handover success rate.

In some possible implementations, the second message includes acknowledgement information of a candidate secondary access network device, in the at least one candidate secondary access network device, successfully added by the master access network device, and/or information about a candidate secondary access network device, in the at least one candidate secondary access network device, unsuccessfully added by the master access network device.

The addition status is learned more succinctly by using ACK or NACK, to reduce signaling transmission overheads and reduce identification overheads of the first secondary access network device.

According to a third aspect, a communication method is provided. The method may be applied to a communication system including a master access network device and a first secondary access network device, and the method includes receiving, from the master access network device, a first message, where the first message includes handover triggering condition information of one or more cells corresponding to at least one candidate secondary access network device, and sending a first response message to the master access network device, where the first response message is used to indicate a second cell corresponding to a second secondary access network device in the at least one candidate secondary access network device, and the second cell meets a handover triggering condition indicated by handover triggering condition information of the second cell.

The terminal device receives the first message including the handover triggering condition information of the one or more cells corresponding to the at least one candidate secondary access network device, and actively performs, based on the handover triggering condition information, handover to a cell corresponding to a secondary access network device. Therefore, a success rate of cell handover is improved, a speed of SN change is increased, and flexibility of SN change is improved.

In some possible implementations, handover triggering condition information of a first cell corresponding to the at least one candidate secondary access network device is used to indicate one or more of a valid time of the handover triggering condition information of the first cell, a handover triggering condition of the first cell, and a priority of the first cell, where the handover triggering condition of the first cell includes a measurement quality threshold for triggering the terminal device to be handed over to the first cell or a quality deviation threshold for triggering the terminal device to be handed over to the first cell, and a quality deviation includes a difference between measurement quality of a channel between the terminal device and a serving cell and measurement quality of a channel between the terminal device and the first cell.

The terminal device sends the first message including the handover triggering condition information of the one or more cells corresponding to the at least one candidate secondary access network device, so that the terminal device can actively perform, based on the handover triggering condition information, handover to the cell corresponding to the secondary access network device. Therefore, a success rate of cell handover is improved, a speed of SN change is increased, and flexibility of SN change is improved.

In some possible implementations, the first response message includes a cell identifier of the second cell.

According to a fourth aspect, a communication method is provided. The method may be applied to a communication system including a first master access network device MN and a first secondary access network device SN, and the method includes receiving, from the first MN, a first message, where the first message includes handover triggering condition information of one or more cells corresponding to at least one candidate MN, and sending a first response message to a second MN in the at least one candidate MN, where the first response message is used to indicate a second cell corresponding to the second MN, and the second cell corresponding to the second MN meets a handover triggering condition of the second cell corresponding to the second MN.

A terminal device receives the first message from the first MN, and determines, based on the handover triggering condition, the second MN that meets the handover triggering condition. Specifically, the second cell corresponding to the second MN may meet the handover triggering condition of the second cell. In other words, in this embodiment of this application, the terminal device can actively perform, based on the handover triggering condition information, handover to a cell corresponding to a secondary access network device, to improve a success rate of cell handover.

In some possible implementations, the first message is further used to indicate one or more cells corresponding to at least one candidate SN corresponding to each of the at least one candidate MN, and a handover triggering condition of one or more cells corresponding to the at least one candidate SN. The first response message is further used to indicate a second cell corresponding to a second SN in the at least one candidate SN, where the second cell corresponding to the second SN meets a handover triggering condition of the second cell corresponding to the second SN.

Because performing MN handover by the terminal device may cause SN change, in this embodiment of this application, the first message may be further used to indicate the at least one candidate SN that can perform a DC with each candidate MN. In this way, after the terminal device performs the MN handover, the terminal device may further select, based on a handover triggering condition of the at least one candidate SN corresponding to a selected MN, the second SN from the at least one candidate SN corresponding to the selected MN, to avoid selecting an SN that cannot perform a DC with the second MN, and improve communication efficiency.

In some possible implementations, before the sending a first response message to a second MN, the method further includes determining the second cell corresponding to the second SN, based on the handover triggering condition of the one or more cells corresponding to the at least one candidate SN corresponding to the second MN and measurement quality of the one or more cells corresponding to the at least one candidate SN.

The terminal device may select, based on the measurement quality of the one or more cells corresponding to the at least one candidate SN, the second cell that meets the handover triggering condition. This can help the terminal device select a second cell with relatively high communication quality, to help improve communication quality.

In some possible implementations, before the sending a first response message to a second MN, the method further includes determining, based on the handover triggering condition of the one or more cells corresponding to the at least one candidate MN and measurement quality of the one or more cells corresponding to the at least one candidate MN, the second cell corresponding to the second MN that is from the at least one candidate MN.

The terminal device may detect measurement quality of a cell corresponding to each of the at least one candidate MN. If measurement quality of the second cell corresponding to the second MN is greater than a quality threshold of the second cell, the second cell is used as a cell to which the terminal device is to be handed over. Alternatively, if the terminal device detects that a difference between measurement quality of a current serving cell and the measurement quality of the second cell corresponding to the second MN is greater than or equal to a quality deviation threshold corresponding to the second cell, the second cell is used as a cell to which the terminal device is to be handed over, to help improve communication quality after the handover.

In some possible implementations, the first message is further used to indicate a valid time of the handover triggering condition.

A handover triggering condition of each cell may have a valid time, and the corresponding handover triggering condition is released after the valid time. Alternatively, handover triggering conditions of all cells may have a valid time, in other words, all handover triggering conditions are released after the valid time. Therefore, flexibility of cell handover is improved.

In some possible implementations, a handover triggering condition of a first cell includes a measurement quality threshold for triggering the terminal device to be handed over to the first cell or a quality deviation threshold for triggering the terminal device to be handed over to the first cell, a quality deviation includes a difference between measurement quality of a channel between the terminal device and a serving cell and measurement quality of a channel between the terminal device and the first cell, and the first cell is a cell corresponding to the at least one candidate MN.

Selection of a handover cell in the two manners may both further improve communication quality after handover to a cell corresponding to a master access network device.

In some possible implementations, a handover triggering condition of a first cell includes a measurement quality threshold for triggering the terminal device to be handed over to the first cell or a quality deviation threshold for triggering the terminal device to be handed over to the first cell, a quality deviation includes a difference between measurement quality of a channel between the terminal device and a serving cell and measurement quality of a channel between the terminal device and the first cell, and the first cell is a cell corresponding to the at least one candidate SN.

Selection of a handover cell in the two manners may both further improve communication quality after handover to the cell corresponding to the secondary access network device.

According to a fifth aspect, a communication method is provided. The method may be applied to a communication system including a first master access network device MN and a first secondary access network device SN, and the method includes obtaining a handover triggering condition of one or more cells corresponding to at least one candidate MN, and sending a first message to a terminal device, where the first message is used to indicate a handover triggering condition of one or more cells corresponding to the at least one candidate MN.

The first MN may obtain the handover triggering condition of the one or more cells corresponding to the at least one candidate MN, and sends, to the terminal device, the first message used to indicate the handover triggering condition of the one or more cells corresponding to the at least one candidate MN, so that the terminal device can actively perform, based on the handover triggering condition information, handover to a cell corresponding to a secondary access network device. Therefore, a success rate of cell handover is improved.

In some possible implementations, the first message further includes an identifier of at least one candidate SN corresponding to each of the at least one candidate MN, and a handover triggering condition of the at least one candidate SN. The first response message further includes a cell identifier of a target cell corresponding to a second SN in the at least one candidate SN, and measurement quality of the target cell corresponding to the second SN meets a handover triggering condition of the target cell corresponding to the second SN.

Because performing MN handover by the terminal device may cause SN change, the first message may be further used to indicate the at least one candidate SN that can perform a DC with each candidate MN. In this way, after the terminal device performs the MN handover, the terminal device may further select, based on a handover triggering condition of the at least one candidate SN corresponding to a selected MN, the second SN from the at least one candidate SN corresponding to the selected MN, to avoid selecting an SN that cannot perform a DC with a second MN, and improve communication efficiency.

In some possible implementations, the method further includes receiving first information from a second MN in the at least one candidate MN, where the first information is used to indicate that the second SN and the first SN are a same SN, and sending second information to the first SN, where the second information is used to indicate the first SN to store terminal device UE context information of the terminal device.

There is a connection relationship between the second MN and the first MN. The second MN may send the first information to the first MN, and indicate, by using the first information, that the second SN and the first SN are the same SN. The first MN then sends the second information to the first SN. After the first SN receives the first information and the second information, the first SN may not release the context of the UE stored in the first SN. This avoids re-establishment after release, to reduce resource overheads.

In some possible implementations, the first message is further used to indicate a valid time of the handover triggering condition.

A handover triggering condition of each cell may have a valid time, and the corresponding handover triggering condition is released after the valid time. Alternatively, handover triggering conditions of all cells may have a valid time, in other words, all handover triggering conditions are released after the valid time. Therefore, flexibility of cell handover is improved.

In some possible implementations, a handover triggering condition of a first cell includes a measurement quality threshold for triggering the terminal device to be handed over to the first cell or a threshold of measurement quality deviation for triggering the terminal device to be handed over to the first cell, and the first cell is a cell corresponding to the at least one candidate MN.

Selection of a handover cell in the two manners may both further improve communication quality after handover to a cell corresponding to a master access network device.

In some possible implementations, a handover triggering condition of a first cell includes a measurement quality threshold for triggering the terminal device to be handed over to the first cell or a threshold of measurement quality deviation for triggering the terminal device to be handed over to the first cell, and the first cell is a cell corresponding to the at least one candidate SN.

Selection of a handover cell in the two manners may both further improve communication quality after handover to the cell corresponding to the secondary access network device.

According to a sixth aspect, a communication method is provided. The method may be applied to a communication system including a first master access network device MN and a first secondary access network device SN, and the method includes receiving a first response message, where the first response message is used to indicate a second cell corresponding to a second MN, and used to indicate a second cell corresponding to a second SN, where the second cell corresponding to the second MN meets a handover triggering condition of the second cell corresponding to the second MN, and the second cell corresponding to the second SN meets a handover triggering condition of the second cell corresponding to the second SN, and sending first information, where the first information is used to indicate that the second SN and the first SN are a same SN.

The first MN may obtain a handover triggering condition of one or more cells corresponding to at least one candidate MN, and sends, to a terminal device, a first message used to indicate the handover triggering condition of the one or more cells corresponding to the at least one candidate MN, so that the terminal device can actively perform, based on the handover triggering condition, handover to a cell corresponding to a secondary access network device, and send the first response message to a second master access network device, to help the second MN learn that the second MN is selected, and further establish random access between the second MN and the terminal device. In this way, handover efficiency is improved.

In some possible implementations, the sending first information includes sending the first information to the first MN.

If the second MN has established a connection to the first SN, the second MN may directly send, to the first SN, indication information used to indicate that the second SN and the first SN are the same SN, so that signaling overheads are reduced.

In some possible implementations, the method further includes sending second information to the first SN, where the second information is further used to indicate the first SN to store terminal device UE context information of the terminal device.

To be specific, after the first SN receives the first information and the second information, the first SN may not release the context of the UE stored in the first SN. This avoids re-establishment after release, to reduce resource overheads.

In some possible implementations, the handover triggering condition of the second cell includes a measurement quality threshold for triggering the terminal device to be handed over to the second cell or a threshold of measurement quality deviation for triggering the terminal device to be handed over to the second cell, and the second cell is a cell corresponding to the second SN or a cell corresponding to the second MN.

Selection of a handover cell in the two manners may both further improve communication quality after handover to a cell corresponding to a master access network device or the secondary access network device.

According to a seventh aspect, an apparatus is provided. The apparatus may be a master access network device, or a chip used in the master access network device, for example, a chip that may be disposed in the master access network device. It may be understood that the apparatus is an access network device. When serving a terminal device, the access network device serves as a master access network device. When serving another terminal device, the access network device may alternatively serve as a secondary access network device. The apparatus has a function of implementing the first aspect, the fifth aspect, or the sixth aspect, and various possible implementations. The function may be implemented by hardware, or may be implemented by hardware executing corresponding software. The hardware or the software includes one or more modules corresponding to the function.

In a possible design, the apparatus includes a receiving module and a sending module. Optionally, the apparatus further includes a processing module. The transceiver module may be, for example, at least one of a transceiver, a receiver, or a transmitter. The receiving module and the sending module may include a radio frequency circuit or an antenna. The processing module may be a processor. Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, so that the apparatus performs the communication method according to the first aspect, the fifth aspect, or the sixth aspect, and various possible implementations. In this design, the apparatus may be the master access network device.

In another possible design, when the apparatus is the chip, the chip includes a receiving module and a sending module. Optionally, the apparatus further includes a processing module. The receiving module and the sending module may be, for example, an input/output interface, a pin, a circuit, or the like on the chip. The processing module may be, for example, a processor. The processing module may execute instructions, to enable the chip in the master access network device to perform the communication method according to the first aspect, the fifth aspect, or the sixth aspect, and various possible implementations thereof. Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

Any processor mentioned above may be a general-purpose central processing unit (CPU), a microprocessor, an application-specific integrated circuit (ASIC), or one or more integrated circuits configured to control program execution of the communication method according to the first aspect, the fifth aspect, or the sixth aspect, and various possible implementations thereof.

According to an eighth aspect, an apparatus is provided. The apparatus may be a secondary access network device, or a chip used in the secondary access network device, for example, a chip that may be disposed in the secondary access network device. It may be understood that the apparatus is an access network device. When serving a terminal device, the access network device serves as a secondary access network device. When serving another terminal device, the access network device may alternatively serve as a master access network device. The apparatus has a function of implementing the second aspect and various possible implementations. The function may be implemented by hardware, or may be implemented by hardware executing corresponding software. The hardware or the software includes one or more modules corresponding to the function.

In a possible design, the apparatus includes a receiving module and a sending module. Optionally, the apparatus further includes a processing module. The receiving module and the sending module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, so that the apparatus performs the method according to any one of the second aspect or the possible implementations thereof.

In another possible design, when the apparatus is the chip, the chip includes a receiving module and a sending module. Optionally, the chip further includes a processing module. The receiving module and the sending module may be, for example, an input/output interface, a pin, a circuit, or the like on the chip. The processing module may be, for example, a processor. The processing module may execute instructions, to enable the chip in the secondary access network device to perform the communication method according to the second aspect and various possible implementations thereof.

Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

Any processor mentioned above may be a general-purpose central processing unit (CPU), a microprocessor, an application-specific integrated circuit (ASIC), or one or more integrated circuits configured to control program execution of the communication methods according to the foregoing aspects.

According to a ninth aspect, an apparatus is provided. The apparatus may be a terminal device, or a chip used in the terminal device, for example, a chip that may be disposed in the terminal device. The apparatus has a function of implementing the third aspect or the fourth aspect, and various possible implementations. The function may be implemented by hardware, or may be implemented by hardware executing corresponding software. The hardware or the software includes one or more modules corresponding to the function.

In a possible design, the apparatus includes a receiving module and a sending module. Optionally, the apparatus further includes a processing module. The receiving module and the sending module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, so that the apparatus performs the method according to any one of the third aspect or the fourth aspect or various possible implementations thereof.

In another possible design, when the apparatus is the chip, the chip includes a receiving module and a sending module. Optionally, the chip further includes a processing module. The receiving module and the sending module may be, for example, an input/output interface, a pin, a circuit, or the like on the chip. The processing module may be, for example, a processor. The processing module may execute instructions, to enable the chip in the terminal device to perform the communication method according to the third aspect or the fourth aspect, and various possible implementations thereof.

Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

Any processor mentioned above may be a general-purpose central processing unit (CPU), a microprocessor, an application-specific integrated circuit (ASIC), or one or more integrated circuits configured to control program execution of the communication methods according to the foregoing aspects.

According to a tenth aspect, a computer storage medium is provided. The computer storage medium stores program code. The program code is used to indicate instructions for performing the method according to the first aspect, the fifth aspect, or the sixth aspect, and various possible implementations thereof.

According to an eleventh aspect, a computer storage medium is provided. The computer storage medium stores program code. The program code is used to indicate instructions for performing the method according to the second aspect and various possible implementations thereof.

According to a twelfth aspect, a computer storage medium is provided. The computer storage medium stores program code. The program code is used to indicate instructions for performing the method according to the third aspect or the fourth aspect and various possible implementations thereof.

According to a thirteenth aspect, a computer program product including instructions is provided. When the computer program product runs on a computer, the computer is enabled to perform the method according to the first aspect, the fifth aspect, or the sixth aspect, or various possible implementations thereof.

According to a fourteenth aspect, a computer program product including instructions is provided. When the computer program product runs on a computer, the computer is enabled to perform the method according to the second aspect or various possible implementations thereof.

According to a fifteenth aspect, a computer program product including instructions is provided. When the computer program product runs on a computer, the computer is enabled to perform the method in the third aspect or the fourth aspect, or various possible implementations thereof.

According to a sixteenth aspect, a communication system is provided. The communication system includes one or more of an apparatus having functions for implementing the methods and various possible designs in the first aspect, an apparatus having functions for implementing the methods and various possible designs in the second aspect, and an apparatus having functions for implementing the methods and various possible designs in the third aspect.

According to a seventeenth aspect, a communication system is provided. The communication system includes one or more of an apparatus having functions for implementing the methods and various possible designs in the fourth aspect, an apparatus having functions for implementing the methods and various possible designs in the fifth aspect, and an apparatus having functions for implementing the methods and various possible designs in the sixth aspect.

Based on the foregoing technical solutions, the master access network device receives, from the first secondary access network device, the handover triggering condition information of the one or more cells corresponding to the at least one candidate secondary access network device, and sends, to the terminal device, the first message including the handover triggering condition information of the one or more cells corresponding to the at least one candidate secondary access network device, so that the terminal device can actively perform, based on the handover triggering condition information, handover to the cell corresponding to the secondary access network device. Therefore, a success rate of cell handover is improved, a speed of SN change is increased, and flexibility of SN change is improved.

DETAILED DESCRIPTION OF ILLUSTRATIVE EMBODIMENTS

Figure 1:
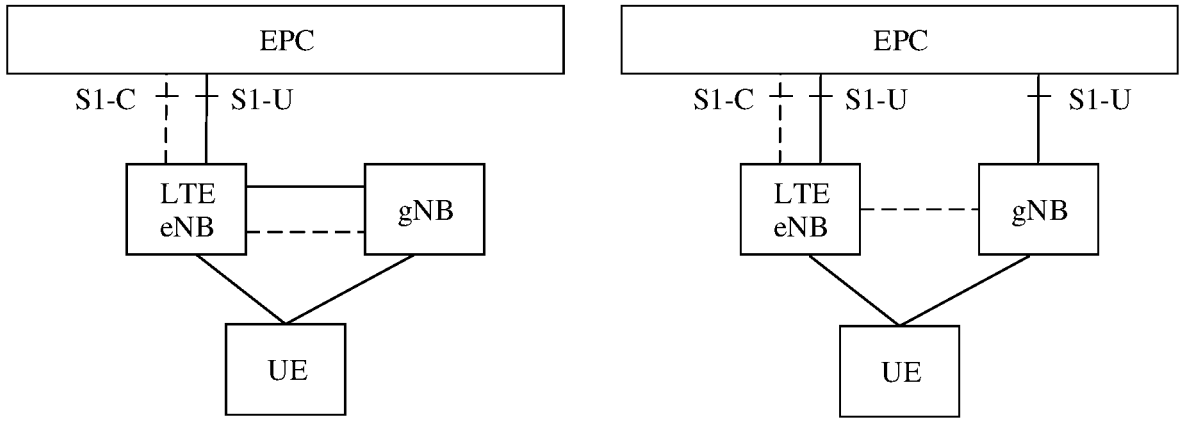
FIG. 1 is a schematic diagram of a communication architecture according to an embodiment of this application.

The following describes technical solutions in this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

A terminal device in the embodiments of this application may be user equipment, an access terminal device, a subscriber unit, a subscriber station, a mobile station, a remote station, a remote terminal device, a mobile device, a user terminal device, a terminal device, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

An access network device in the embodiments of this application may be a device configured to communicate with the terminal device, and the access network device may be an evolved NodeB (eNB, or eNodeB) in an LTE system, or a radio controller in a cloud radio access network (CRAN) scenario. Alternatively, the access network device may be a relay station, an access point, a vehicle-mounted device, a wearable device, an access network device in a future 5G network or an access network device in a future evolved PLMN network, or one antenna panel or a group of antenna panels (including a plurality of antenna panels) of a base station in a 5G system. Alternatively, the access network device may be a network node that constitutes a gNB or a transmission point, for example, a baseband unit (BBU) or a distributed unit (DU). This is not limited in the embodiments of this application.

It should be understood that either a master access network device or a secondary access network device in the embodiments of this application may be any one of the foregoing access network devices.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements of a radio link control (RLC) layer, a media access control (MAC) layer, and a physical (PHY) layer. The AAU implements some physical layer processing functions, radio frequency processing, and functions related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node. In addition, the CU may be an access network device in an access network (radio access network, RAN), or may be an access network device in a core network (CN). This is not limited in this application.

In the embodiments of this application, the terminal device or the access network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). An operating system corresponding to the operating system layer may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device, the access network device, or a function module that can invoke and execute the program and that is in the terminal device or the access network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (compact disc, CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

The following describes related terms used in this application.

1. Carrier Aggregation (CA)

A terminal device may simultaneously use a plurality of cells for uplink and downlink communication, to support high-speed data transmission. One of the plurality of cells is a primary cell (PCell), and another cell is a secondary cell (SCell). In CA, a physical downlink control channel (PDCCH) and a physical downlink shared channel (PDSCH) are allowed to be in a same carrier component (CC) or different carrier components, that is, cross-carrier scheduling is allowed. A CC, a bandwidth part (BWP), a CC/BWP, and a CC and/or BWP may usually be equivalently replaced because these concepts all describe a segment of frequency domain resources. A CC may also be equivalently replaced with a cell. The BWP represents a continuous segment of frequency domain resources. For example, the BWP may be understood as a continuous frequency band, the frequency band includes at least one continuous subband, and each bandwidth part may correspond to a group of numerologies. Different bandwidth parts may correspond to different numerologies.

2. Primary Cell (PCell)

A PCell is a cell on which a terminal device performing CA camps, and the terminal device performing the CA corresponds to a physical uplink control channel (PUCCH).

3. Secondary Cell (SCell)

An SCell is a cell configured, by using radio resource control (radio resource control, RRC) connection signaling, for a terminal device performing CA, works on an secondary component carrier (SCC), and may provide more radio resources for the terminal device performing the CA. In the SCell, there may be only downlink transmission or both uplink and downlink transmission.

4. Primary Secondary Cell (PSCell)

A PSCell is a special secondary cell on a secondary gNB configured, by using RRC connection signaling, by a master gNB for UE performing a dual connectivity (DC).

5. DC

In DC, two base stations both provide a data transmission service for one terminal device at the same time. One base station in which a PCell is located is referred to as a master gNB (MgNB), and the other base station in which a PSCell is located is referred to as a secondary gNB (SgNB). The master gNB is a control plane anchor. To be specific, a terminal device establishes an RRC connection to the master gNB, the master gNB establishes a control plane connection to a core network element, and an RRC message is transmitted between the master gNB and the terminal device. In a subsequent enhancement technology, some RRC messages (for example, measurement configuration information or a measurement report) may also be sent between the secondary gNB and the terminal device.

6. Master Cell Group (MCG)

In DC, a plurality of serving cells of the master gNB form an MCG. The MCG may specifically include one PCell and one or more SCells.

7. Secondary Cell Group (SCG)

A plurality of serving cells in a secondary gNB form an SCG. An MCG may specifically include one PSCell and one or more SCells.

8. Conditional Handover (CHO) Mechanism

An original base station sends configuration information of a CHO to a terminal device when source link quality is relatively good. The configuration information of the conditional handover may include a handover triggering condition and information about one or more candidate cells. Specifically, the information about the one or more candidate cells may include a PCI of a candidate cell and frequency information corresponding to the candidate cell. The frequency information corresponding to the candidate cell may include one or more of the following an absolute frequency of a synchronization signal block SSB, an absolute frequency location (for example, absoluteFrequencyPointA) of a reference resource module (common RBo), a frequency bandwidth list (for example, frequencyBandList), and a subcarrier spacing (SCS)-specific carrier list (for example, scs-SpecificCarrierList). After receiving the configuration information of the conditional handover, the UE determines, based on the configuration information, whether each candidate cell meets the handover triggering condition, and uses a candidate cell that meets the handover triggering condition as a target cell. After determining the target cell, the UE initiates a random access procedure to the target cell. After random access is completed, the UE sends an RRC message (for example, an RRC reconfiguration complete message) to a base station (namely, a target base station) to which the target cell belongs, to notify the target base station of completion of the conditional handover.

FIG. 1 is a schematic diagram of a communication architecture according to an embodiment of this application. The communication architecture may be referred to as an E-UTRA new radio dual connectivity (E-UTRA NR DC, EN-DC), or may be referred to as an Option3 series. In the communication architecture, an LTE base station serves as a master node (MN), and an NR base station serves as a secondary node (node, SN), to perform a DC. In addition, both the MN and the SN are connected to an EPC, and can provide air interface transmission resources for data between UE and the EPC. That the MN and the SN are connected to the EPC may be that the MN and the SN are separately connected to the EPC. Alternatively, that the MN and the SN are connected to the EPC may be that the MN is connected to the EPC, and the SN is connected to the EPC by using the MN. The MN may also be referred to as an "anchor".

It should be noted that in this application, an LTE base station may be an eNB or an ng-eNB, and an NR base station may be a gNB.

Figure 2:
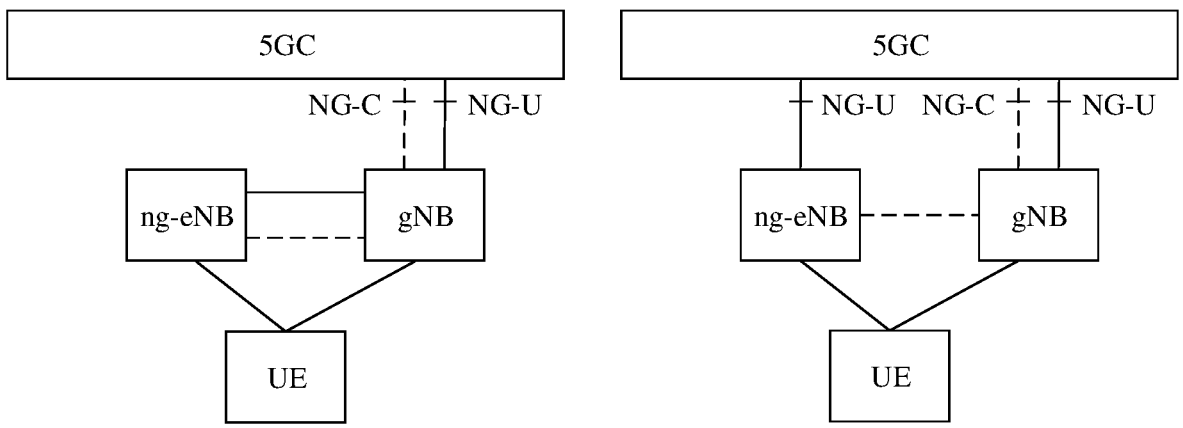
FIG. 2 is a schematic diagram of a communication architecture according to another embodiment of this application.

FIG. 2 is a schematic diagram of a communication architecture according to another embodiment of this application. The communication architecture may be referred to as a new radio E-UTRA dual connectivity (NR E-UTRA DC, NE-DC), or may be referred to as an Option4 series. The NR base station serves as a master node and the LTE base station serves as a secondary node. In addition, both the master node and the secondary node are connected to a 5GC, and can provide air interface transmission resources for data between UE and the 5GC. That the MN and the SN are connected to the 5GC may be that the MN and the SN are separately connected to the 5GC. Alternatively, that the MN and the SN are connected to the 5GC may be that the MN is connected to the 5GC, and the SN is connected to the 5GC by using the MN.

Figure 3:
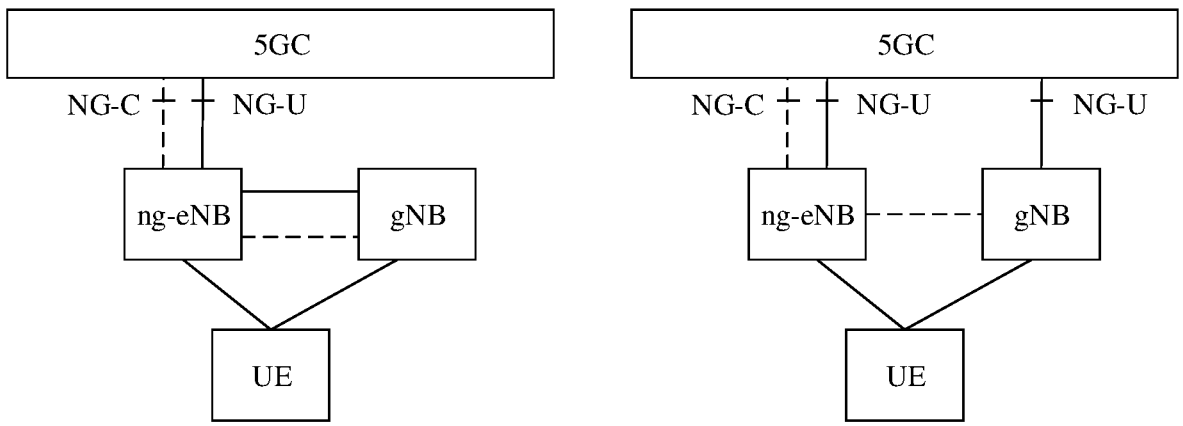
FIG. 3 is a schematic diagram of a communication architecture according to another embodiment of this application.

FIG. 3 is a schematic diagram of a communication architecture according to another embodiment of this application. The communication architecture may be referred to as a next generation E-UTRA new radio dual connectivity (Next Generation E-UTRA NR DC, NG EN-DC), or may be referred to as an Option7 series. In the communication architecture, an LTE base station is a master node, and an NR base station is a secondary node, to perform a DC. Both the MN and the SN are connected to a 5GC, and provide air interface transmission resources for data between UE and the 5GC. That the MN and the SN are connected to the 5GC may be that the MN and the SN are separately connected to the 5GC. Alternatively, that the MN and the SN are connected to the 5GC may be that the MN is connected to the 5GC, and the SN is connected to the 5GC by using the MN.

It should be further noted that this application may be further applied to a communication system in which DC is performed by NR base stations.

Figure 4:
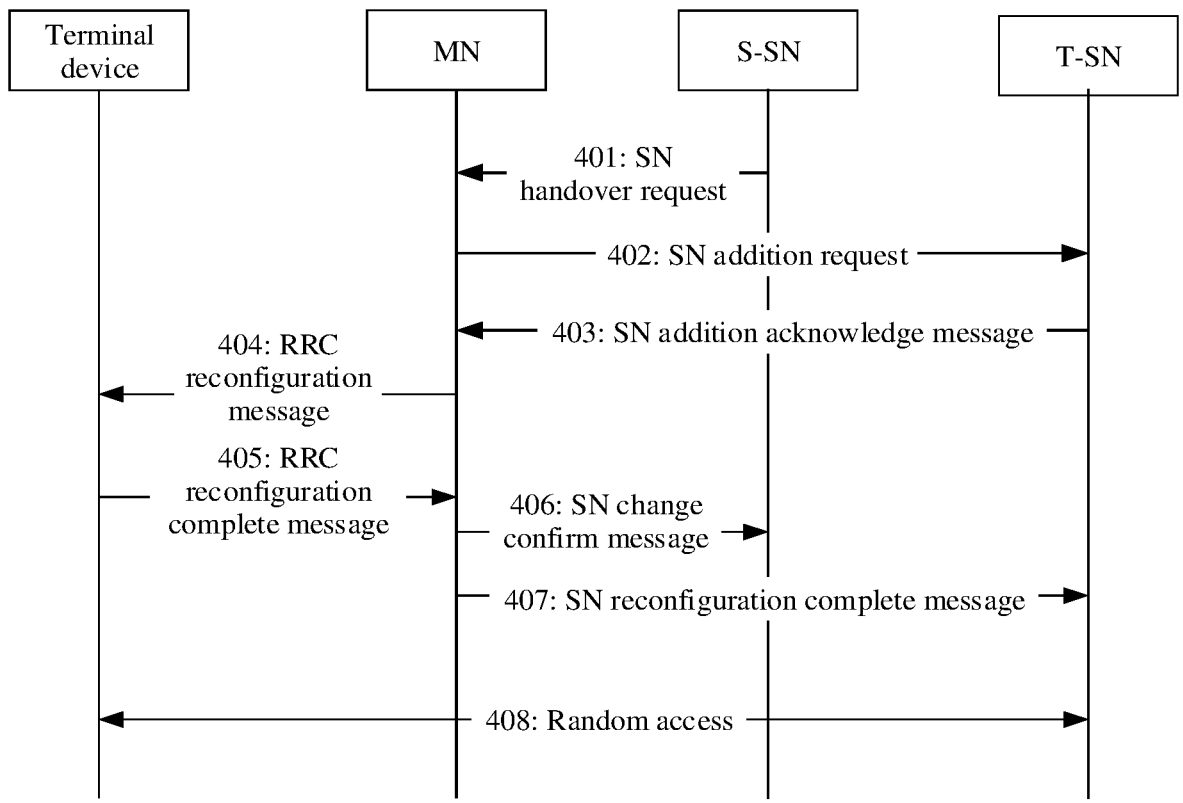
FIG. 4 is a schematic flowchart of a method for cell handover in a secondary gNB in a conventional solution.

FIG. 4 is a schematic flowchart of a method for cell handover in a secondary gNB in a conventional solution.

401: A source SN (S-SN) sends an SN change required message to an MN. The change required message includes an identifier of a candidate target SN, a possible SCG configuration, and a measurement result related to the candidate target SN.

402: The MN sends an SN addition request message to a target SN (T-SN), where the SN addition request message is used to request resource allocation for a terminal device. The SN addition request message includes the measurement result related to the target SN in step 401.

403: The target SN feeds back an SN addition request acknowledge message to the MN, where the SN addition request acknowledge message is used to indicate a resource allocated to the terminal device. Specifically, the SN addition request acknowledge message includes full or delta RRC configuration (where an RRC configuration may also be referred to as an SN RRC configuration).

404: The MN sends an RRC reconfiguration message to the terminal device, where the RRC reconfiguration message includes the RRC configuration.

405: The terminal device applies a new configuration in the RRC reconfiguration message, and sends an RRC reconfiguration complete message to the MN.

It should be noted that if the terminal device cannot comply with a part of or all of configurations in the RRC reconfiguration message, reconfiguration of the terminal device fails. For example, the terminal device may not perform step 405, or the terminal device indicates, by using the RRC reconfiguration complete message in step 405, that the reconfiguration fails.

406: If determining that resource allocation of the target SN succeeds, the MN sends an SN change confirm message to the S-SN.

407: Determine that the terminal device completes the new configuration in the RRC reconfiguration message, and send an SN reconfiguration complete message to the T-SN.

408: If RRC connection reconfiguration succeeds, the terminal device initiates random access to the target SN, and completes synchronization of the target SN.

In a dual connectivity (DC) scenario, a terminal device can communicate with two access network devices at the same time. How to hand over a cell corresponding to a master/secondary access network device, or flexibly change a master/secondary access network device, and improve reliability and robustness of cell handover or change of the master/secondary access network device is a problem to be urgently resolved. In this application, a conditional master/secondary access network device change (conditional MN/SN change or CHO MN/SN change) or a conditional handover is introduced to improve reliability and robustness of handover. Specifically, the master access network device or the secondary access network device determines or negotiates for determining a handover triggering condition of a conditional change of one or more candidate master/secondary access network devices, and then sends the handover triggering condition to the terminal device. The terminal device determines whether the handover triggering condition is met, and initiates a connection to a candidate cell that meets the triggering condition. In this way, a handover triggering condition is delivered in advance. This avoids a case in which a source access network device may fail to deliver a handover command because communication quality gradually decreases, and improves reliability and robustness of change of the master/secondary access network device.

Figure 5:
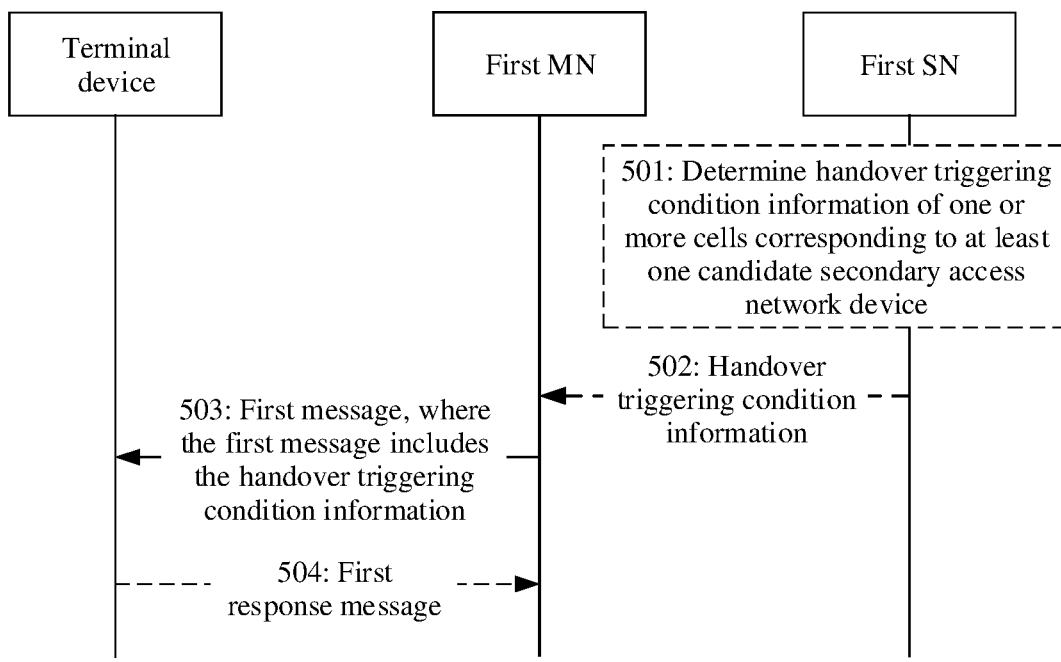
FIG. 5 is a schematic flowchart of a communication method according to an embodiment of this application.

FIG. 5 is a schematic flowchart of a communication method according to an embodiment of this application.

It should be noted that this application may be applied to a communication system including a master access network device and a first secondary access network device, in other words, a terminal device may form a dual connectivity to the master access network device and the first secondary access network device.

It should be further noted that when this embodiment of this application is performed by the master access network device, this embodiment may be specifically performed by a chip in the master access network device. Correspondingly, when this embodiment of this application is performed by a secondary access network device, this embodiment may be specifically performed by a chip in the secondary access network device. When this embodiment of this application is performed by the terminal device, this embodiment may be specifically performed by a chip in the terminal device. The following embodiment is described by using the master access network device, the secondary access network device, or the terminal device as an example. However, this application is not limited thereto.

501: The first secondary access network device determines handover triggering condition information of one or more cells corresponding to at least one candidate secondary access network device.

Specifically, the first secondary access network device may determine handover triggering condition information of one or more cells corresponding to each of the at least one candidate secondary access network device.

It may be understood that the first secondary access network device determines, based on a measurement result, the handover triggering condition information of the one or more cells corresponding to the at least one candidate secondary access network device, where a handover triggering condition may be configured for each cell, or may be configured for each candidate secondary access network device (to be specific, cells corresponding to a same access network device may use a same handover triggering condition).

It should be understood that one or more cells corresponding to one candidate secondary access network device may be all or a part of cells corresponding to the candidate secondary access network device. This is not limited in this application.

Optionally, handover triggering condition information of a first cell corresponding to the at least one candidate secondary access network device is used to indicate a handover triggering condition of the first cell. The handover triggering condition of the first cell may be a measurement quality threshold for triggering the terminal device to be handed over to the first cell or a quality deviation threshold for triggering the terminal device to be handed over to the first cell. A quality deviation is a difference between measurement quality of a channel between the terminal device and a serving cell and measurement quality of a channel between the terminal device and the first cell.

Specifically, the handover triggering condition of the first cell specifically includes the measurement quality threshold for triggering the terminal device to be handed over from the current serving cell to the first cell. For example, when the measurement quality of a channel between the terminal device and the first cell is greater than or equal to the measurement quality threshold, the terminal device may be handed over from the current serving cell to the first cell.

Alternatively, the handover triggering condition of the first cell specifically includes the quality deviation threshold for triggering the terminal device to be handed over from the current serving cell to the first cell. The quality deviation includes the difference between the measurement quality of the terminal device in the current serving cell and the measurement quality of a channel between the terminal device and the first cell. Alternatively, the quality deviation is a difference between the measurement quality of a channel between the terminal device and the first cell and the measurement quality of the terminal device in the current serving cell. For example, when the difference between the measurement quality of the terminal device in the current serving cell and the measurement quality of a channel between the terminal device and the first cell is greater than or equal to the quality deviation threshold, the terminal device may be handed over from the current serving cell to the first cell.

It should be understood that the first cell is one of the one or more cells. For ease of description, the first cell is used as an example for description in this embodiment of this application.

Optionally, the handover triggering condition information may be further used to indicate a valid time of the handover triggering condition information or a priority of the first cell.

Specifically, the terminal device does not perform cell handover based on the handover triggering condition information when the valid time of the handover triggering condition information of the first cell expires. The valid time may be controlled by using a timer. For example, the terminal device enables the timer when receiving the handover triggering condition information, and releases a configuration of the triggering condition information when the timer expires. When the terminal device detects that a handover triggering condition of a cell is met, the timer may stop timing.

The terminal device may determine, based on priorities of different cells, to which cell the terminal device is preferably handed over. If the terminal device determines that a handover triggering condition of a cell of a first priority is not currently met, the terminal device continues to determine whether a handover condition of a cell of a second priority is met.

It should be noted that the triggering condition may alternatively be used to indicate two or three of the handover triggering condition of the first cell, the valid time of the handover triggering condition information of the first cell, or the priority of the first cell. This is not limited in this application.

502: The master access network device obtains the handover triggering condition information of the one or more cells corresponding to the at least one candidate secondary access network device.

Specifically, after obtaining the handover triggering condition information of the one or more cells corresponding to the at least one candidate secondary access network device, the master access network device may initiate a procedure of adding the at least one candidate secondary access network device. The procedure is used to request the at least one candidate secondary access network device to allocate a resource to the terminal device, and enable an added candidate secondary access network device and the master access network device to implement a DC with the terminal device to communicate with the terminal device.

It should be noted that the handover triggering condition information may be carried in an X2/Xn interface message (for example, a CHO SN change required message, or a new X2/Xn interface message). The X2/Xn interface message may further carry an identifier of the at least one candidate secondary access network device. Optionally, the X2/Xn interface message may further carry a cell identifier of the one or more cells corresponding to the at least one candidate secondary access network device and/or an SCG configuration. The SCG configuration may be used to support delta configuration of a secondary cell group.

It should be further noted that a procedure in which the master access network device adds the candidate secondary access network device may be initiated by the master access network device. For example, the master access network device sends a triggering request to a candidate secondary access network device that the master access network device intends to add. The candidate secondary access network device may also feed back a response message of the triggering request.

In an embodiment, step 502 may be specifically that the master access network device receives, from the first secondary access network device, the handover triggering condition information of the one or more cells corresponding to the at least one candidate secondary access network device. Correspondingly, the first secondary access network device sends the handover triggering condition information of the one or more cells corresponding to the at least one candidate secondary access network device to the master access network device.

Specifically, the first secondary access network device may obtain, through detection, the handover triggering condition information of the one or more cells corresponding to the at least one candidate secondary access network device, and send the handover triggering condition information of the one or more cells corresponding to the at least one candidate secondary access network device to the master access network device.

In another embodiment, step 502 may be specifically that the master access network device may set the handover triggering condition information of the one or more cells corresponding to the at least one candidate secondary access network device. For example, an MN sets the handover triggering condition information based on a candidate SN list that is obtained from an SN and measurement result information (where the measurement result information is also optional).

It should be understood that, in this embodiment, step 501 may not be performed.

In still another embodiment, step 502 may be specifically that the master access network device may first receive, from the first secondary access network device, handover triggering condition information of one or more cells corresponding to a plurality of candidate secondary access network devices. Then, modification or adjustment is performed to obtain the handover triggering condition information of the one or more cells corresponding to the at least one candidate secondary access network device carried in a first message in step 503.

It should be understood that a quantity of cells to which the handover triggering condition information in step 502 belongs may be different from a quantity of cells to which the handover triggering condition information included in the first message in step 503 belongs. For example, when the master access network device unsuccessfully adds a secondary access network device to which a cell belongs, the first message does not carry handover triggering condition information of the cell corresponding to the secondary access network device.

Optionally, the master access network device may further send a second message to the first secondary access network device, where the second message is used to indicate a status of adding a candidate secondary access network device by the master access network device.

Specifically, the addition status may be that the master access network device successfully or unsuccessfully adds the candidate secondary access network device. The master access network device may indicate, by using the second message, only a successfully added candidate secondary access network device, in other words, the first secondary access network device may directly learn of the candidate secondary access network device successfully added by the master access network device. Alternatively, the master access network device indicates, by using the second message, only a candidate secondary access network device to which a connection fails to be established, in other words, the first secondary access network device indirectly learns of a candidate secondary access network device successfully added by the master access network device. Alternatively, the master access network device indicates, by using the second message, a successfully added candidate secondary access network device and an unsuccessfully added candidate secondary access network device.

Optionally, that the second message indicates the successfully added candidate secondary access network device may be implemented by using acknowledgement information of the successfully added candidate secondary access network device, that is, the second message includes the acknowledgement information of the successfully added candidate secondary access network device. For example, the acknowledgement information may be an acknowledgement (acknowledgement character, ACK). That the second message indicates the unsuccessfully added candidate secondary access network device may be implemented by using information about the unsuccessfully added candidate secondary access network device, that is, the second message includes the information about the unsuccessfully added candidate secondary access network device. For example, a negative acknowledgement (NACK) indicates that a corresponding candidate secondary access network device is unsuccessfully added.

Optionally, the second message may further carry a reason why the unsuccessfully added candidate secondary access network device fails to be added.

503: The master access network device sends the first message to the terminal device, where the first message includes the handover triggering condition information. Correspondingly, the terminal device receives the first message from the master access network device.

Specifically, the master access network device sends, to the terminal device, the first message including the handover triggering condition information of the one or more cells corresponding to the at least one candidate secondary access network device, so that the terminal device can actively perform, based on the handover triggering condition information, handover to a cell corresponding to a secondary access network device. Therefore, a success rate of cell handover is improved.

It should be understood that the first message may be an RRC reconfiguration message, or may be a brand new message. This is not limited in this application.

Optionally, the master access network device may further obtain measurement quality information of the one or more cells corresponding to the at least one candidate secondary access network device, or configuration information of the one or more cells corresponding to the at least one candidate secondary access network device, include the measurement quality information or the configuration information in the first message, and send the first message to the terminal device.

Specifically, configuration information of the first cell in the one or more cells may include at least one of a time-frequency resource allocated to the terminal device by a candidate secondary access network device to which the first cell belongs, measurement quality of the first cell, or an address of the candidate secondary access network device to which the first cell belongs. The address of the candidate secondary access network device may be used by the master access network device to forward data through the candidate secondary access network device.

Optionally, the master access network device may receive, from a first candidate secondary access network device, measurement quality information of one or more cells corresponding to the first candidate secondary access network device. Alternatively, the measurement quality information may be pre-stored in a storage module of the master access network device, and the master access network device obtains the measurement quality information from the storage module.

It should be noted that the first candidate secondary access network device may be any one of the at least one candidate secondary access network device, in other words, the master access network device may receive, from each of the at least one candidate secondary access network device, measurement quality information of one or more cells corresponding to the corresponding candidate secondary access network device.

Optionally, the configuration information, of the one or more cells corresponding to the at least one candidate secondary access network device, obtained by the master access network device may be received from each candidate secondary access network device, or may be pre-stored in the storage module of the master access network device and obtained from the storage module.

Optionally, before receiving configuration information from the first candidate secondary access network device, the master access network device may send a first request to the corresponding candidate secondary access network device. In other words, after receiving the first request, the first candidate secondary access network device sends the configuration information to the master access network device.

It should be noted that the master access network device may send a request to each of the at least one candidate secondary access network device, to request each candidate secondary access network device to respond with configuration information.

It should be further noted that the first request and the foregoing triggering request may be carried in a same message. Correspondingly, the configuration information may also be carried in a response message of the foregoing triggering request.

It should be further understood that the configuration information may be carried in an SN radio resource control reconfiguration (RRC reconfiguration) message, or may be carried in a brand new message. This is not limited in this application.

504: The terminal device sends a first response message to the master access network device, where the first response message is used to indicate a second cell corresponding to a second secondary access network device in the at least one candidate secondary access network device, and the second cell meets handover triggering condition information of the second cell. Correspondingly, the master access network device receives the first response message from the terminal device.

Specifically, the terminal device determines, based on handover triggering condition information of each cell, that the second cell meets a handover triggering condition indicated by the handover triggering condition information of the second cell, that is, the terminal device is to be handed over to the second cell. The terminal device sends the first response message to the master access network device, and indicates the second cell by using the first response message. In addition, after determining the second cell, the terminal device may initiate random access to the second secondary access network device to which the second cell belongs, and complete synchronization with the second secondary access network device.

It should be noted that, in this embodiment of this application, step 504 may not be performed. In other words, the terminal device may not notify the master access network device of a finally selected secondary access network device.

It should be understood that the first response message may be an RRC reconfiguration complete message.

Optionally, the first response message may include a cell identifier of the second cell.

Optionally, the master access network device may further notify the first secondary access network device or the second secondary access network device of the second cell corresponding to the second secondary access network device selected by the terminal device from the at least one candidate secondary access network device.

Specifically, for example, the master access network device sends a second response message to the first secondary access network device, where the second response message is used to indicate the second cell. The master access network device sends a third response message to the second secondary access network device, where the third response message is used to indicate the second message. The second response message may include an address of the second secondary access network device, in other words, the master access network device may send the address of the second secondary access network device to the first secondary access network device. The first secondary access network device may send data to the second secondary access network device. The second secondary access network device forwards the data to the terminal device.

Therefore, in this embodiment of this application, the master access network device receives, from the first secondary access network device, the handover triggering condition information of the one or more cells corresponding to the at least one candidate secondary access network device, and sends, to the terminal device, the first message including the handover triggering condition information of the one or more cells corresponding to the at least one candidate secondary access network device, so that the terminal device can actively perform, based on the handover triggering condition information, handover to the cell corresponding to the secondary access network device. Therefore, the success rate of cell handover is improved. In addition, a speed of performing changing to the cell corresponding to the secondary access network device is increased, and flexibility of performing changing to the cell corresponding to the secondary access network device is improved.

Figure 6:
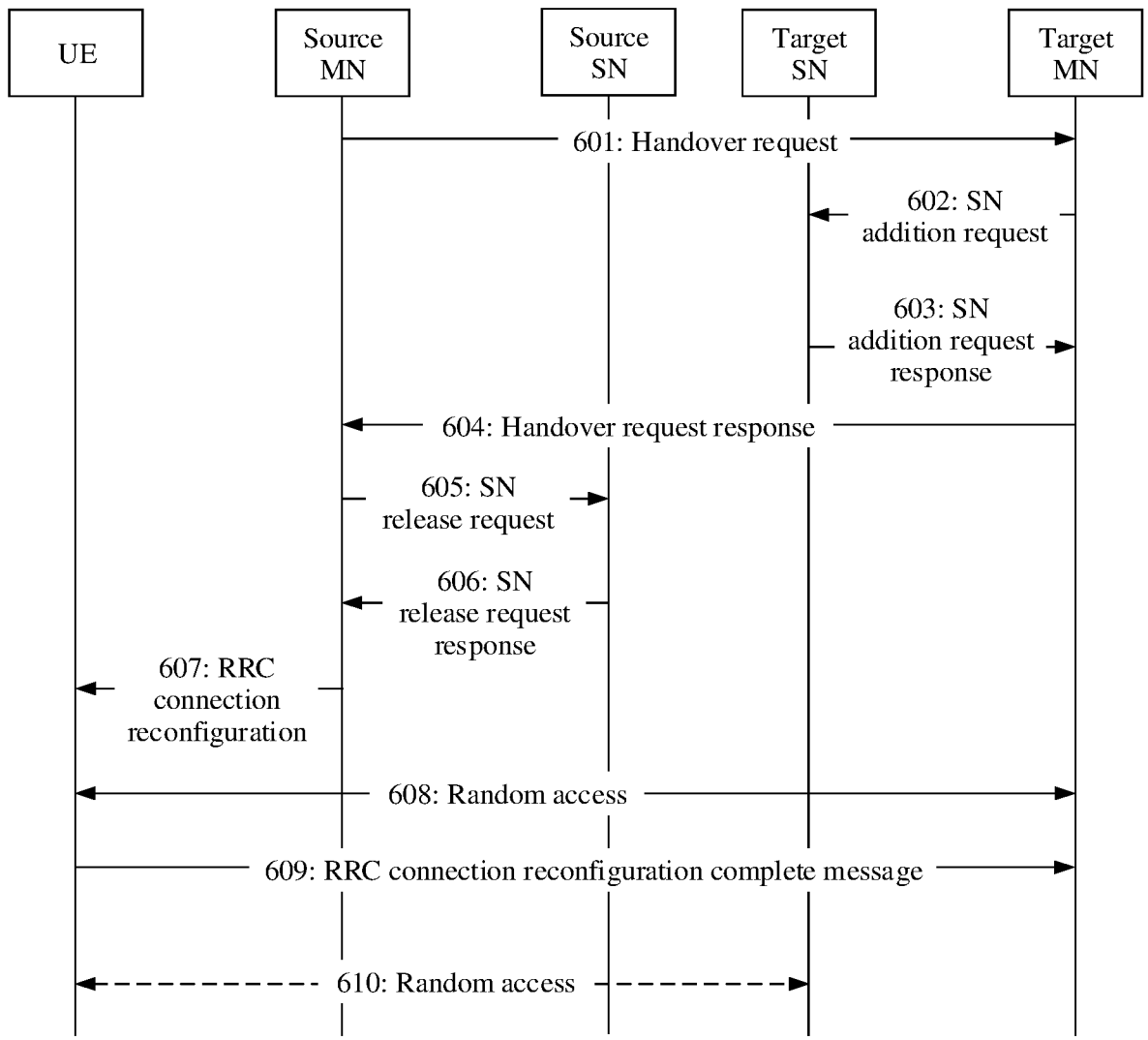
FIG. 6 is a schematic flowchart of a method for handover to a cell corresponding to a master access network device in a conventional solution.

FIG. 6 is a schematic flowchart of a method for handover to a cell corresponding to a master access network device in a conventional solution.

601: In a dual connectivity scenario, a source MN determines a target MN, and sends a handover request to the target MN.

602: After receiving the handover request, the target MN sends an SN addition request to a target SN.

603: The target SN feeds back a response message (SN addition request acknowledge) to the target MN.

604: The target MN sends a handover request response message to the source MN.

605: The source MN sends an SN release request to a source SN.

606: The source SN feeds back a response message (SN release request acknowledge) of the SN release request.

607: The source MN sends an RRC connection reconfiguration to a terminal device.

608: The terminal device initiates random access (random access procedure) to the target MN.

609: The terminal device sends an RRC connection reconfiguration complete (RRC connection reconfiguration complete) message to the target MN.

610: The terminal device initiates random access to the target SN.

In a dual connectivity (DC) scenario, a terminal device can communicate with two access network devices at the same time. How to perform handover to a cell corresponding to a master access network device, to improve a success rate of cell handover needs to be urgently resolved.

Figure 7:
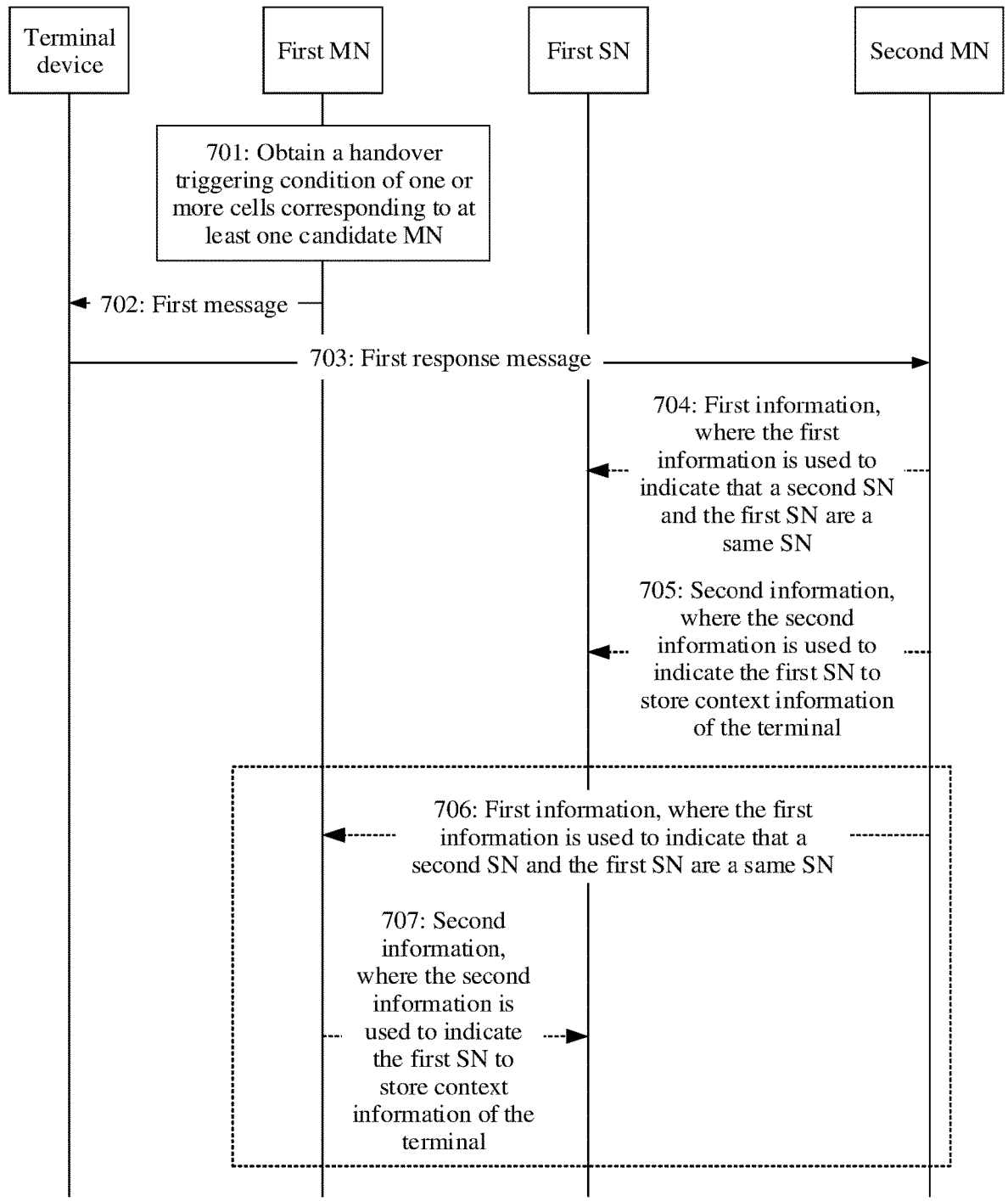
FIG. 7 is a schematic flowchart of a communication method according to an embodiment of this application.

FIG. 7 is a schematic flowchart of a communication method according to an embodiment of this application.

It should be noted that this application may be applied to a communication system including a first master access network device and a first secondary access network device, in other words, a terminal device may form a dual connectivity to the first master access network device and the first secondary access network device.

It should be further noted that when this embodiment of this application is performed by a master access network device, this embodiment may be specifically performed by a chip in the master access network device. Correspondingly, when this embodiment of this application is performed by a secondary access network device, this embodiment may be specifically performed by a chip in the secondary access network device. When this embodiment of this application is performed by the terminal device, this embodiment may be specifically performed by a chip in the terminal device. The following embodiment is described by using the master access network device, the secondary access network device, or the terminal device as an example. However, this application is not limited thereto.

It should be noted that, unless otherwise specified, same terms in this embodiment of this application and the foregoing embodiments have same meanings. To avoid repetition, details are not described herein again.

701: A first MN obtains a handover triggering condition of one or more cells corresponding to at least one candidate MN.

Specifically, the first MN may receive, from each candidate MN, a handover triggering condition of one or more cells corresponding to the candidate MN, or may generate, based on stored information about each candidate MN, the handover triggering condition of the one or more cells corresponding to the at least one candidate MN. For example, the first MN may select the at least one candidate MN based on a measurement report.

Optionally, that the first MN receives, from each candidate MN, a handover triggering condition of one or more cells corresponding to the candidate MN may be that each candidate MN actively sends the handover triggering condition of the one or more cells, or may be that the first MN receives a handover triggering condition fed back by a first candidate MN after sending a handover triggering condition request to a candidate MN (for example, the first candidate MN).

It should be noted that, after receiving the handover triggering condition request, the first candidate MN may add at least one candidate secondary access network device, to be specific, add a secondary access network device that can establish a DC with the first candidate MN. For example, the first candidate MN sends an SN addition request to the secondary access network device, and after receiving addition acknowledge information (addition request ack) fed back by the secondary access network device, the first candidate MN determines that the secondary access network device is successfully added. A candidate secondary access network device added by each of the at least one candidate MN may be determined by the first MN, or may be determined by each candidate MN.

It should be understood that the handover triggering condition request may be a CHO request message or a new X2/Xn interface message. A handover triggering condition may be carried in handover request acknowledge (CHO request acknowledge) information. The CHO request message may further carry a port identifier (SN UE X2AP ID or SN UE XnAP ID) of the first SN, an identifier of the first SN, and UE context information of the first SN. If a candidate secondary access network device to be added by a candidate MN (for example, the first candidate MN) is determined by the first MN, the CHO request message may further carry an identifier of the candidate secondary access network device to be added by the first candidate MN.

It should be understood that the at least one candidate MN may separately add respective candidate secondary access network device.

It should be further understood that the candidate secondary access network device separately added by the at least one candidate MN may include the first secondary access network device, or may not include the first secondary access network device. This is not limited in this application.

Optionally, a handover triggering condition of a first cell includes a measurement quality threshold for triggering the terminal device to be handed over to the first cell or a quality deviation threshold for triggering the terminal device to be handed over to the first cell. A quality deviation includes a difference between measurement quality of a channel between the terminal device and a serving cell and measurement quality of a channel between the terminal device and the first cell. Alternatively, the quality deviation includes a difference between measurement quality of a channel between the terminal device and the first cell and measurement quality of the terminal device in a current serving cell. The first cell is a cell corresponding to an MN or a cell corresponding to an SN.

Specifically, the handover triggering condition in this embodiment of this application is specific to a cell. The following description uses the first cell as an example for description. However, this application is not limited thereto. For example, the first cell is a cell corresponding to the at least one candidate MN.

The handover triggering condition of the first cell is specifically the measurement quality threshold for triggering the terminal device to be handed over from the current serving cell to the first cell. For example, when the measurement quality of a channel between the terminal device and the first cell is greater than or equal to the measurement quality threshold, the terminal device may be handed over from the current serving cell to the first cell.

Alternatively, the handover triggering condition of the first cell is specifically the quality deviation threshold for triggering the terminal device to be handed over from the current serving cell to the first cell. The quality deviation is the difference between the measurement quality of the terminal device in the current serving cell and the measurement quality of a channel between the terminal device and the first cell. For example, when the difference between the measurement quality of the terminal device in the current serving cell and the measurement quality of a channel between the terminal device and the first cell is greater than or equal to the quality deviation threshold, the terminal device may be handed over from the current serving cell to the first cell.

702: The first MN sends a first message to the terminal device, where the first message is used to indicate the handover triggering condition of the one or more cells corresponding to the at least one candidate MN. Correspondingly, the terminal device receives the first message from the first MN.

Specifically, the terminal device receives the first message from the first MN, and determines, based on the handover triggering condition, a second MN that meets the handover triggering condition. Specifically, a second cell corresponding to the second MN may meet a handover triggering condition of the second cell. In other words, in this embodiment of this application, the terminal device can actively perform, based on handover triggering condition information, handover to a cell corresponding to a secondary access network device, to improve a success rate of cell handover.

It should be noted that the first message may directly include the handover triggering condition of the one or more cells corresponding to the at least one candidate MN, or may indirectly indicate, by using other information, the handover triggering condition of the one or more cells corresponding to the at least one candidate MN.

It should be further noted that after step 702, the terminal device may initiate random access to the second MN and a second SN.

It should be understood that the first message may be an RRC reconfiguration message, or may be a brand new message. This is not limited in this application.

Optionally, that the terminal device determines the second MN may be specifically determining, based on the handover triggering condition of the one or more cells corresponding to the at least one candidate MN and measurement quality of the one or more cells corresponding to the at least one candidate MN, the second cell corresponding to the second MN that is from the at least one candidate MN.

Specifically, the terminal device may detect measurement quality of a cell corresponding to each of the at least one candidate MN. If measurement quality of the second cell corresponding to the second MN is greater than a quality threshold of the second cell, the second cell is used as a cell to which the terminal device is to be handed over. Alternatively, if the terminal device detects that a difference between measurement quality of a current serving cell and measurement quality of the second cell corresponding to the second MN is greater than or equal to a quality deviation threshold corresponding to the second cell, the second cell is used as a cell to which the terminal device is to be handed over.

Optionally, the first message is further used to indicate one or more cells corresponding to at least one candidate SN corresponding to each of the at least one candidate MN, and the handover triggering condition of the one or more cells corresponding to the at least one candidate SN.

Specifically, because performing MN handover by the terminal device may cause SN change, in this embodiment of this application, the first message may be further used to indicate at least one candidate SN that can perform a DC with each candidate MN. In this way, after the terminal device performs the MN handover, the terminal device may further select, based on a handover triggering condition of at least one candidate SN corresponding to a selected MN, the second SN from the at least one candidate SN corresponding to the selected MN, to avoid selecting an SN that cannot perform a DC with the second MN, and improve communication efficiency.

It should be understood that content of the handover triggering condition of any one of the one or more cells corresponding to the at least one candidate SN may be specific content of the foregoing handover triggering condition of the first cell. To avoid repetition, details are not described herein again.

Optionally, that the terminal device determines the second SN may be specifically that the terminal device determines, based on a handover triggering condition of one or more cells corresponding to at least one candidate SN corresponding to the second MN and measurement quality of the one or more cells corresponding to the at least one candidate SN, a second cell corresponding to the second SN that is from the at least one candidate SN.

It should be noted that the second SN and the first SN may be a same SN, or may be different SNs. In other words, the at least one candidate SN corresponding to the second MN may include the first SN, and the terminal device further selects the first SN as a target SN.

Optionally, the first message may further be used to indicate a valid time of the handover triggering condition.

Specifically, a handover triggering condition of each cell may have a valid time, and the corresponding handover triggering condition is released after the valid time. Alternatively, handover triggering conditions of all cells may have a valid time, in other words, all handover triggering conditions are released after the valid time.

703: The terminal device sends a first response message to the second MN.

Specifically, the terminal device may send the first response message to the second MN, where the first response message is used to indicate the second cell corresponding to the second MN.

It should be understood that the first response message may be an RRC connection reconfiguration complete message.

Optionally, the first response message includes a cell identifier of the second cell corresponding to the second MN.

Optionally, the first response message may be further used to indicate the second cell corresponding to the second SN. Specifically, the first response message includes a cell identifier of the second cell corresponding to the second SN.

704: The second MN sends first information to the first SN, where the first information is used to indicate that the second SN and the first SN are the same SN.

Specifically, if the second MN has established a connection to the first SN, the second MN may directly send, to the first SN, indication information used to indicate that the second SN and the first SN are the same SN. For example, after adding the first SN, the second MN establishes the connection to the first SN.

It should be noted that the first information may be carried in an SN reconfiguration complete message, and the SN reconfiguration complete message is used to indicate that the terminal device completes access to the second MN.

705: The second MN sends second information to the first SN, where the second information is used to indicate the first SN to store context information of the terminal device.

Specifically, the second MN may directly send, to the second SN, second indication information used to indicate the first SN to store the context information of the terminal device. To be specific, after the first SN receives first indication information and the second indication information, the first SN may not release the context of the UE stored in the first SN. This avoids re-establishment after release, to reduce resource overheads.

706: The second MN may send first information to the first MN, where the first information is used to indicate that the second SN and the first SN are the same SN.

It should be noted that the first information may be carried in a release message, and the release message is used to indicate the first MN to release a connection to the terminal device and release a connection to the first SN.

707: After receiving the first information sent by the second MN, the first MN sends second information to the first SN, where the second information is used to indicate the first SN to store context information of the terminal device.

Specifically, there is a connection relationship between the second MN and the first MN. The second MN may send the first information to the first MN, and indicate, by using the first information, that the second SN and the first SN are the same SN. The first MN then sends the second information to the first SN. After the first SN receives the first information and the second information, the first SN may not release the context of the UE stored in the first SN. This avoids re-establishment after release, to reduce resource overheads.

It should be noted that in this embodiment of this application, steps 704 and 705 are parallel to steps 706 and 707. In other words, only steps 704 and 705 are performed after step 703, or only steps 706 and 707 are performed after step 703.

It should be further noted that, if only MN handover is related in this embodiment of this application, only steps 701 to 703 may be performed.

Optionally, if the second SN and the first SN are different SNs, steps 704 to 707 may not be performed in this application. The second MN performs sending to the second SN.

It should be noted that if the second SN and the first SN are different SNs, the first information may be carried in a release message, and the release message is used to indicate the first MN to release the connection to the terminal device and release the connection to the first SN. In addition, the first MN may further send the release message to the first SN, so that the first SN releases a connection to the terminal device and releases the connection to the first MN. Specifically, the first SN releases, based on the release message, a control plane resource related to the context of the terminal device.

Figure 8:
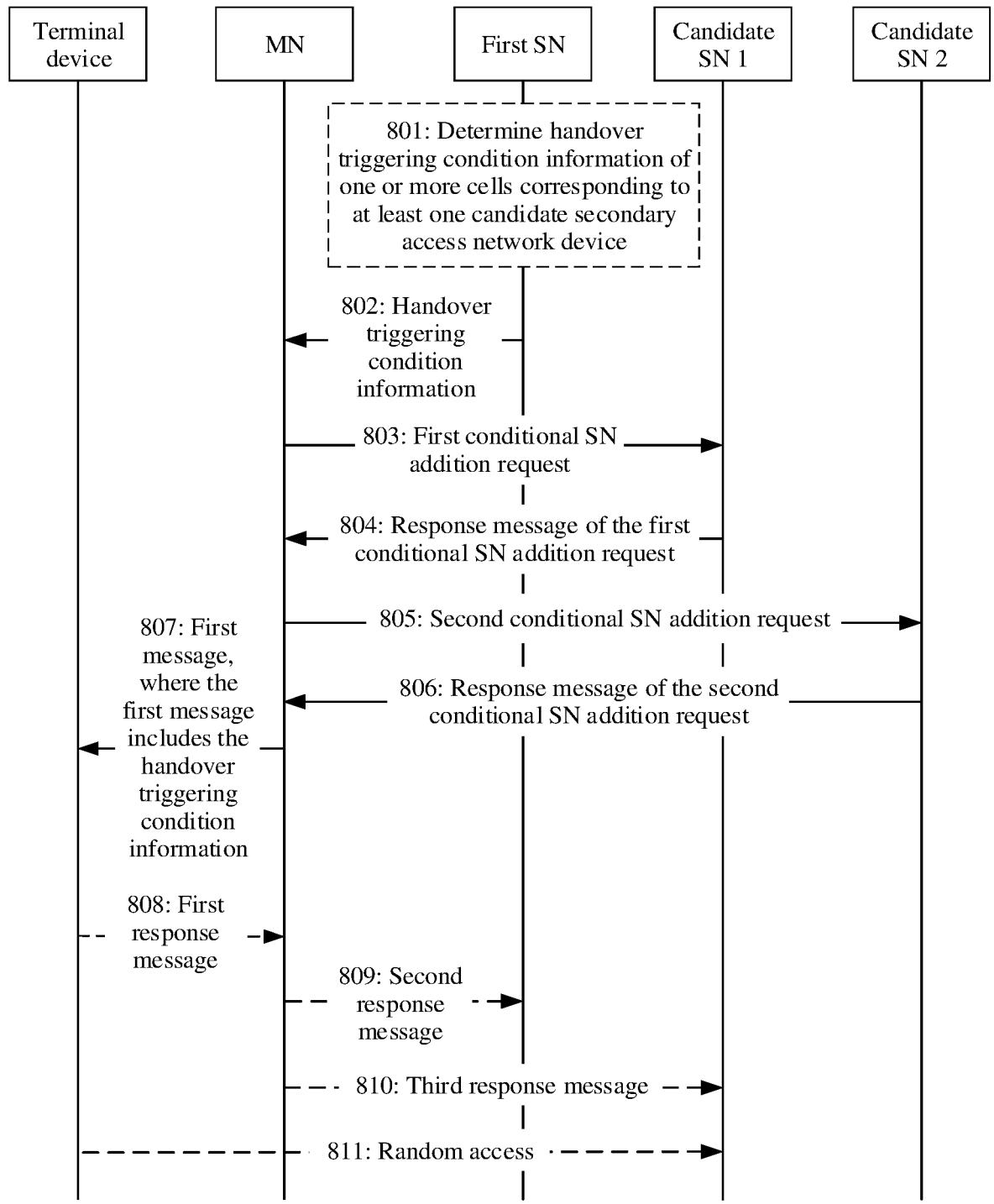
FIG. 8 is a schematic flowchart of a communication method according to a specific embodiment of this application.

FIG. 8 is a schematic flowchart of a communication method according to a specific embodiment of this application.

It should be noted that terms in the embodiment shown in FIG. 8 are the same as terms in the embodiment shown in FIG. 5. To avoid repetition, details are not described herein again.

801: The first SN determines handover triggering condition information of one or more cells corresponding to at least one candidate secondary access network device.

Specifically, the at least one candidate secondary access network device in this embodiment of this application may be described by using a candidate SN 1 and a candidate SN 2.

802: The first SN sends the handover triggering condition information of the one or more cells corresponding to the at least one candidate secondary access network device to an MN.

803: The MN sends a first conditional SN addition request to the at least one candidate secondary access network device based on the handover triggering condition information of the one or more cells corresponding to the at least one candidate secondary access network device. Specifically, the MN sends the first conditional SN addition request to the candidate SN 1, where the first conditional SN addition request is used to request to add the candidate SN 1 to the MN.

It should be understood that the first conditional SN addition request corresponds to the "first request" in the embodiment shown in FIG. 5.

804: The candidate SN 1 feeds back a response message of the first conditional SN addition request to the MN, where the response message carries first configuration information.

805: The MN sends a second conditional SN addition request to the candidate SN 2, where the second conditional SN addition request is used to request to add the candidate SN 2 to the MN.

It should be understood that the second conditional SN addition request corresponds to the "first request" in the embodiment shown in FIG. 5.

806: The candidate SN 2 feeds back a response message of the second conditional SN addition request to the MN, where the response message carries second configuration information.

It should be noted that a sequence of step 803 and step 804 is not limited in this application.

807: The MN sends a first message to a terminal device, where the first message includes the handover triggering condition information.

808: The terminal device sends a first response message to the MN, where the first response message is used to indicate a second cell corresponding to a second secondary access network device that is in the at least one candidate secondary access network device.

809: The MN sends a second response message to the first SN, where the second response message is used to indicate the second cell corresponding to the second secondary access network device that is in the at least one candidate secondary access network device.

It should be understood that the second response message may be an SN change confirm message.

810: The MN sends a third response message to the candidate SN 1, where the third response message is used to indicate the second cell corresponding to the second secondary access network device that is in the at least one candidate secondary access network device.

It should be understood that the third response message may be an SN reconfiguration complete message.

It should be understood that the candidate SN 1 corresponds to the second SN in the embodiment shown in FIG. 5.

It should be further understood that a sequence of step 809 and step 810 is not limited in this application.

811: The MN initiates random access to the candidate SN 1.

It should be noted that a sequence of step 811 and step 809 or step 810 may not be limited either.

Figure 9A:
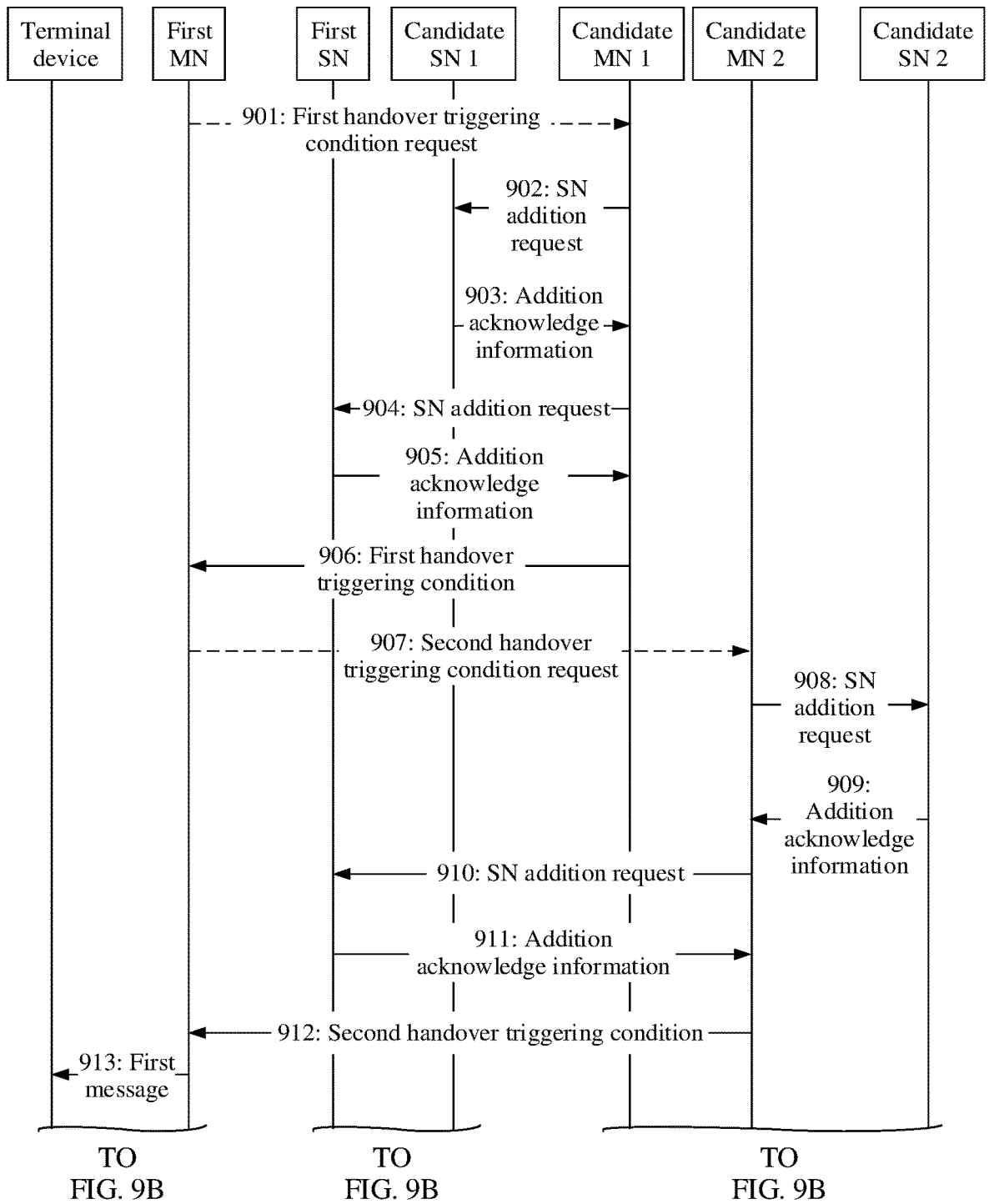
FIG. 9A and FIG. 9B are a schematic flowchart of a communication method according to a specific embodiment of this application.
Figure 9B:
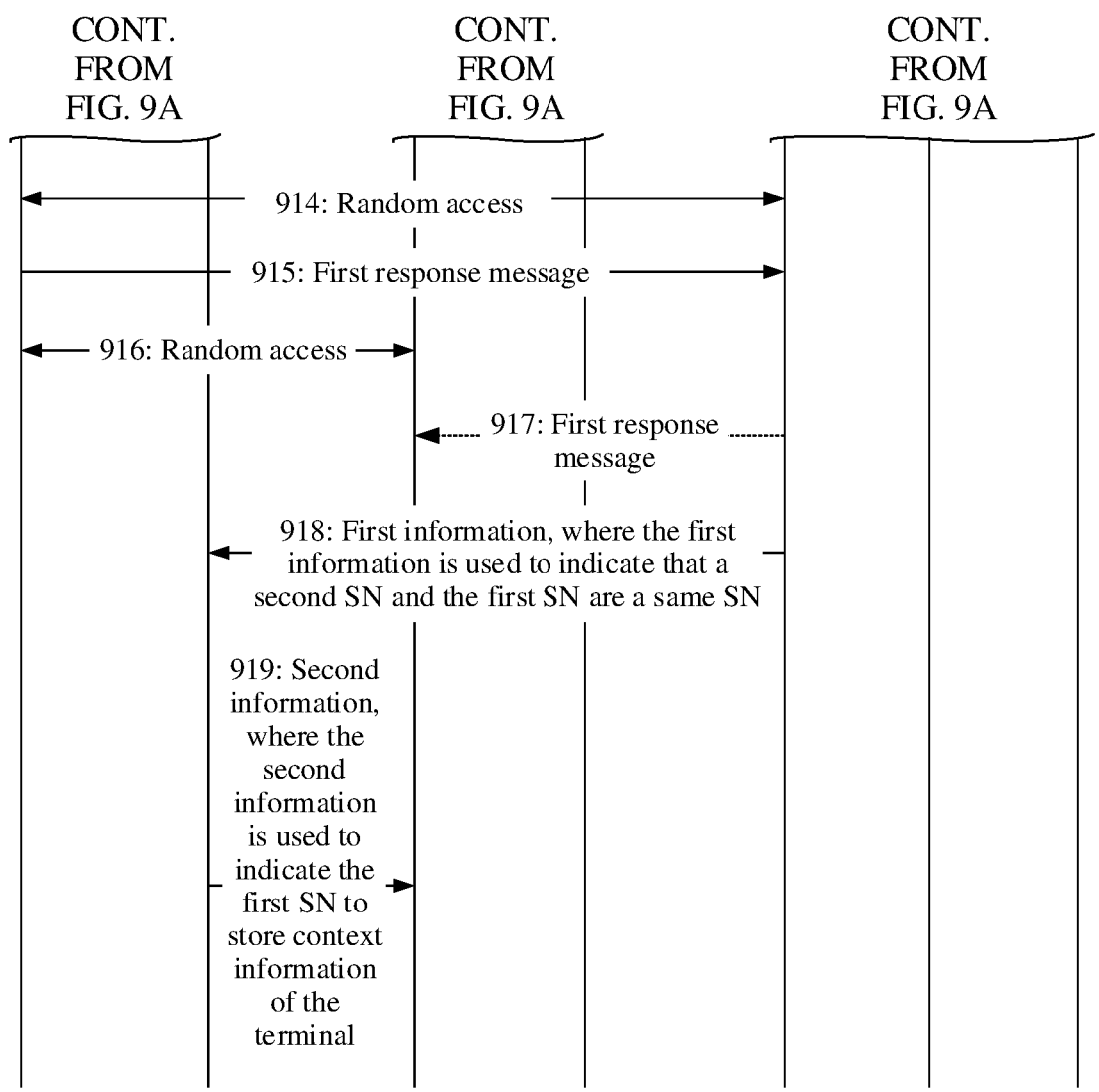

FIG. 9 is a schematic flowchart of a communication method according to a specific embodiment of this application.

It should be noted that terms in the embodiment shown in FIG. 9 are the same as terms in the embodiment shown in FIG. 7. To avoid repetition, details are not described herein again.

901: A first MN sends a handover triggering condition request to at least one candidate MN.

Specifically, in this embodiment of this application, an example in which the at least one candidate MN is a candidate MN 1 and a candidate MN 2 is used for description. That is, the first MN sends a first triggering condition request to the candidate MN 1.

902: The candidate MN 1 sends an SN addition request to a candidate SN 1.

903: The candidate MN 1 receives addition acknowledge information sent by the candidate SN 1. In other words, a terminal device can establish a DC with both the candidate MN 1 and the candidate SN 1 at the same time.

904: The candidate MN 1 sends an SN addition request to a first SN.

905. The candidate MN 1 receives the addition acknowledge information sent by the first SN. In other words, the terminal device can establish a DC with both the candidate MN 1 and the first SN at the same time.

906: The candidate MN 1 sends a first handover triggering condition to the first MN.

907: The first MN sends a second handover triggering condition request to the candidate MN 2.

908: The candidate MN 2 sends an SN addition request to a candidate SN 2, and receives addition acknowledge information sent by the candidate SN 2.

909: The candidate MN 2 receives addition acknowledge information sent by the candidate SN 2. In other words, the terminal device can establish a DC with both the candidate MN 2 and the candidate SN 2 at the same time.

910: The candidate MN 2 sends an SN addition request to the first SN.

911. The candidate MN 2 receives addition acknowledge information sent by the first SN. In other words, the terminal device can establish a DC with both the candidate MN 2 and the first SN at the same time.

912: The candidate MN 2 sends a second handover triggering condition to the first MN.

In other words, at least one handover triggering condition received by the first MN includes the first handover triggering condition and the second handover triggering condition.

It should be noted that a sequence of steps 901 to 905 and steps 906 to 912 is not limited. A sequence of steps 902 and 903 and steps 904 and 905 is not limited. A sequence of steps 908 and 909 and steps 910 and 911 is not limited.

913: The first MN sends a first message, where the first message is used to indicate a handover triggering condition of one or more cells corresponding to the at least one candidate MN.

914: The terminal device initiates random access to the candidate MN 1.

It should be understood that the candidate MN 1 corresponds to the second MN in the embodiment shown in FIG. 7.

915: The terminal device sends a first response message to the candidate MN 1, where the first response message is used to indicate a second cell corresponding to the second MN.

916: The terminal device initiates random access to the first SN.

It should be understood that the first SN and a second SN are a same SN.

917: The candidate MN 1 sends the first response message to the first SN.

918: The candidate MN 1 sends first information to the first MN, where the first information is used to indicate that the second SN and the first SN are the same SN.

919: The first MN sends second information to the first SN, where the second information is used to indicate the first SN to store context information of the terminal device.

The embodiments described in this specification may be independent solutions, or may be combined based on internal logic. These solutions all fall within the protection scope of this application.

It may be understood that, in the foregoing method embodiments, the methods and operations that are implemented by the terminal device may alternatively be implemented by a component (for example, a chip or a circuit) that may be used in the terminal device, and the methods and the operations that are implemented by the access network device may alternatively be implemented by a component (for example, a chip or a circuit) that may be used in the access network device. In addition, the foregoing method embodiments are described from a perspective of interaction between network elements. From the description, method steps performed by a single network element and related description may be directly and undoubtedly obtained. For brevity, details are not described herein.

The foregoing mainly describes the solutions provided in the embodiments of this application from a perspective of interaction. It may be understood that, to implement the foregoing functions, each network element, such as a transmit-end device or a receive-end device, includes a corresponding hardware structure and/or software module for performing each function. A person skilled in the art may be aware that, with reference to the examples described in the embodiments disclosed in this specification, units and algorithm steps may be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, functional modules of the transmit-end device or the receive-end device may be divided based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, division into the modules is an example, and is merely a logical function division. In an actual implementation, another division manner may be used. An example in which each functional module is obtained through division based on a corresponding function is used below for description.

It should be understood that specific examples in the embodiments of this application are merely intended to help a person skilled in the art better understand the embodiments of this application, but are not intended to limit the scope of the embodiments of this application.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

The methods provided in the embodiments of this application are described above in detail with reference to FIG. 5 to FIG. 9A and FIG. 9B. The following describes in detail apparatuses provided in the embodiments of this application with reference to FIG. 10 to FIG. 19. It should be understood that description of the apparatus embodiments corresponds to the description of the method embodiments. Therefore, for content that is not described in detail, refer to the foregoing method embodiments. For brevity, details are not described herein again.

Figure 10:
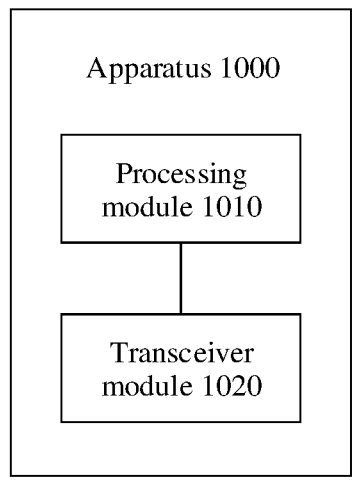
FIG. 10 is a schematic block diagram of a communication apparatus according to an embodiment of this application.

FIG. 10 is a schematic block diagram of a communication apparatus 1000 according to an embodiment of this application.

It should be understood that the apparatus 1000 may correspond to the first MN in the embodiment shown in FIG. 5 or FIG. 8, or a chip in the first MN, and may have any function of the MN in the method. The apparatus 1000 includes a processing module 1010 and a transceiver module 1020.

The processing module 1010 is configured to obtain handover triggering condition information of one or more cells corresponding to at least one candidate secondary access network device.

The transceiver module 1020 is configured to send a first message to the terminal device, where the first message includes the handover triggering condition information.

Optionally, the processing module 1010 is specifically configured to receive the handover triggering condition information from a first secondary access network device by using the transceiver module.

Optionally, the processing module 1010 is specifically configured to generate the handover triggering condition information.

Optionally, the transceiver module 1020 is further configured to receive, from the first secondary access network device, measurement quality information of the one or more cells corresponding to the at least one candidate secondary access network device. The transceiver module is further configured to receive configuration information of one or more cells corresponding to a first candidate access network device from a first candidate secondary access network device in the at least one candidate secondary access network device. The transceiver module is specifically configured to send the first message to the terminal device, where the first message further includes at least one of a cell identifier, configuration information, and the measurement quality information that are of the one or more cells corresponding to the at least one candidate secondary access network device.

Optionally, the transceiver module 1020 is further configured to send a first request to the first candidate secondary access network device, where the first request is used to request the configuration information configured by the first candidate secondary access network device for the terminal device.

Optionally, handover triggering condition information of a first cell corresponding to the at least one candidate secondary access network device is used to indicate one or more of a valid time of the handover triggering condition information of the first cell, a handover triggering condition of the first cell, and a priority of the first cell, where the handover triggering condition of the first cell includes a measurement quality threshold for triggering the terminal device to be handed over to the first cell or a quality deviation threshold for triggering the terminal device to be handed over to the first cell, and a quality deviation includes a difference between measurement quality of a channel between the terminal device and a serving cell and measurement quality of a channel between the terminal device and the first cell.

Optionally, the transceiver module 1020 is further configured to receive a first response message from the terminal device, where the first response message is used to indicate a cell identifier of a second cell that corresponds to a second secondary access network device and that is selected by the terminal device from the at least one candidate secondary access network device. The second cell meets a handover triggering condition indicated by handover triggering condition information of the second cell.

Optionally, the transceiver module 1020 is further configured to send a second message to the first secondary access network device, where the second message is used to indicate a status of adding a candidate secondary access network device by a master access network device.

Optionally, the second message includes acknowledgement information of a candidate secondary access network device successfully added by the master access network device, and/or information about a candidate secondary access network device unsuccessfully added by the master access network device.

Figure 11:
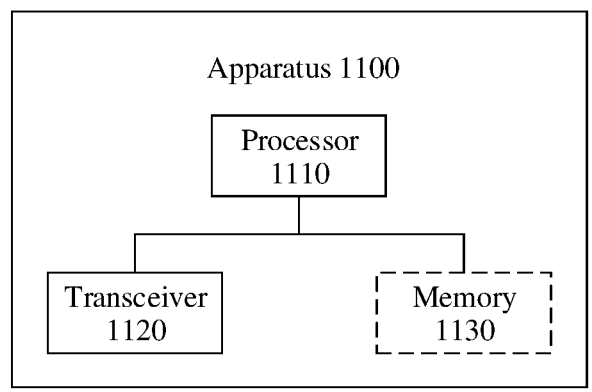
FIG. 11 is a schematic diagram of a structure of a communication apparatus according to an embodiment of this application.

FIG. 11 shows a communication apparatus 1100 according to an embodiment of this application. The apparatus 1100 may be the first MN in FIG. 5 or FIG. 8. The apparatus may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other through an internal connection path. A related function implemented by the processing module 1010 in FIG. 10 may be implemented by the processor 1110, and a related function implemented by the transceiver module 1020 may be implemented by the processor 1110 by controlling the transceiver 1120.

Optionally, the processor 1110 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control a communication apparatus (for example, a base station, a terminal device, or a chip), execute a software program, and process data of the software program.

Optionally, the processor 1110 may include one or more processors, for example, include one or more central processing units (CPUs). When the processor is one CPU, the CPU may be a single-core CPU or a multi-core CPU.

The transceiver 1120 is configured to send data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a random access memory (random access memory, RAM), a read-only memory (ROM), an erasable programmable read-only memory (EPROM), and a compact disc read-only memory (CD-ROM). The memory 1130 is configured to store related instructions and data.

The memory 1130 is configured to store program code and data of the terminal device, and may be a separate device or integrated into the processor 1110.

Specifically, the processor 1110 is configured to control information transmission between the transceiver and the terminal device. For details, refer to the description in the foregoing method embodiments. Details are not described herein again.

During specific implementation, in an embodiment, the apparatus 1100 may further include an output device and an input device. The output device communicates with the processor 1110, and may display information in a plurality of manners. For example, the output device may be a liquid crystal display (liquid crystal display, LCD), a light emitting diode (light emitting diode, LED) display device, a cathode ray tube (cathode ray tube, CRT) display device, a projector (projector), or the like. The input device communicates with the processor, and may receive an input from a user in a plurality of manners. For example, the input device may be a mouse, a keyboard, a touchscreen device, or a sensor device.

It may be understood that FIG. 11 merely shows a simplified design of the communication apparatus. During actual application, the apparatus may further include other necessary components, including but not limited to any quantity of transceivers, processors, controllers, memories, and the like, and all terminal devices that can implement this application shall fall within the protection scope of this application.

In a possible design, the apparatus 1100 may be a chip, for example, may be a communication chip that can be used in the terminal device, and configured to implement a related function of the processor 1110 in the terminal device. The chip may be a field programmable gate array, a dedicated integrated chip, a system chip, a central processing unit, a network processor, a digital signal processing circuit, or a microcontroller for implementing the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal device or may be a circuit. The apparatus may be configured to perform an action performed by the terminal device in the foregoing method embodiments.

Figure 12:
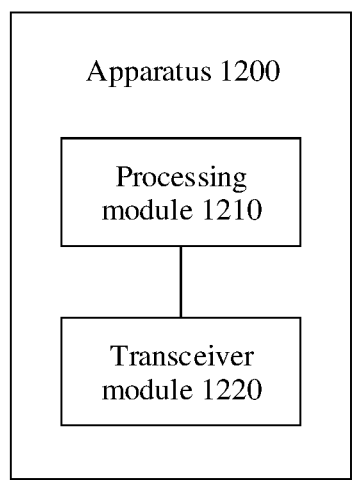
FIG. 12 is a schematic block diagram of a communication apparatus according to another embodiment of this application.

FIG. 12 is a schematic block diagram of a communication apparatus 1200 according to an embodiment of this application.

It should be understood that the apparatus 1200 may correspond to the first SN in the embodiment shown in FIG. 5 or FIG. 8, or a chip in the first SN, and may have any function of the first SN in the method. The apparatus 1200 includes a processing module 1210 and a transceiver module 1220.

The processing module 1210 is configured to determine handover triggering condition information of one or more cells corresponding to at least one candidate secondary access network device.

The transceiver module 1220 is configured to send the handover triggering condition information to a master access network device.

Optionally, handover triggering condition information of a first cell corresponding to the at least one candidate secondary access network device is used to indicate one or more of a valid time of the handover triggering condition information of the first cell, a handover triggering condition of the first cell, and a priority of the first cell, where the handover triggering condition of the first cell includes a measurement quality threshold for triggering the terminal device to be handed over to the first cell or a quality deviation threshold for triggering the terminal device to be handed over to the first cell, and a quality deviation is a difference between measurement quality of a channel between the terminal device and a serving cell and measurement quality of a channel between the terminal device and the first cell.

Optionally, the transceiver module 1220 is further configured to send measurement quality information of the one or more cells corresponding to the at least one candidate secondary access network device to the master access network device.

Optionally, the transceiver module 1220 is further configured to receive a second message from the master access network device, where the second message is used to indicate a status of adding the at least one candidate secondary access network device by the master access network device.

Optionally, the second message includes acknowledgement information of a candidate secondary access network device, in the at least one candidate secondary access network device, successfully added by the master access network device, and/or information about a candidate secondary access network device, in the at least one candidate secondary access network device, unsuccessfully added by the master access network device.

Figure 13:
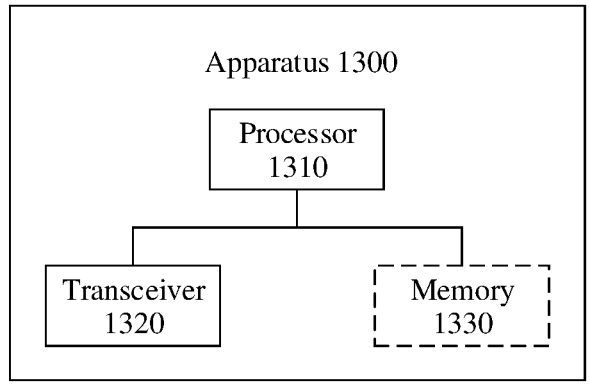
FIG. 13 is a schematic diagram of a structure of a communication apparatus according to an embodiment of this application.

FIG. 13 shows a communication apparatus 1300 according to an embodiment of this application. The apparatus 1300 may be the first SN in FIG. 5 or FIG. 8. The apparatus may use a hardware architecture shown in FIG. 13. The apparatus may include a processor 1310 and a transceiver 1320. Optionally, the apparatus may further include a memory 1330. The processor 1310, the transceiver 1320, and the memory 1330 communicate with each other through an internal connection path. A related function implemented by a processing module 1220 in FIG. 12 may be implemented by the processor 1310, and a related function implemented by a transceiver module 1210 may be implemented by the processor 1310 controlling the transceiver 1320.

Optionally, the processor 1310 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control a communication apparatus (for example, a base station, a terminal device, or a chip), execute a software program, and process data of the software program.

Optionally, the processor 1310 may include one or more processors, for example, include one or more central processing units (CPUs). When the processor is one CPU, the CPU may be a single-core CPU or a multi-core CPU.

The transceiver 1320 is configured to send data and/or a signal, and receive data and/or a signal. The transceiver may include a transmitter and a receiver. The transmitter is configured to send data and/or a signal, and the receiver is configured to receive data and/or a signal.

The memory 1330 includes but is not limited to a random access memory (random access memory, RAM), a read-only memory (ROM), an erasable programmable read-only memory (EPROM), and a compact disc read-only memory (CD-ROM). The memory 1330 is configured to store related instructions and data.

The memory 1330 is configured to store program code and data of the terminal device, and may be a separate device or integrated into the processor 1310.

Specifically, the processor 1310 is configured to control information transmission between the transceiver and the terminal device. For details, refer to the description in the foregoing method embodiments. Details are not described herein again.

During specific implementation, in an embodiment, the apparatus 1300 may further include an output device and an input device. The output device communicates with the processor 1310, and may display information in a plurality of manners. For example, the output device may be a liquid crystal display (LCD), a light emitting diode (LED) display device, a cathode ray tube (CRT) display device, a projector, or the like. The input device communicates with the processor 601, and may receive an input from a user in a plurality of manners. For example, the input device may be a mouse, a keyboard, a touchscreen device, or a sensor device.

It may be understood that FIG. 13 merely shows a simplified design of the communication apparatus. During actual application, the apparatus may further include other necessary components, including but not limited to any quantity of transceivers, processors, controllers, memories, and the like, and all terminal devices that can implement this application shall fall within the protection scope of this application.

In a possible design, the apparatus 1300 may be a chip, for example, may be a communication chip that can be used in the terminal device, and configured to implement a related function of the processor 1310 in the terminal device. The chip may be a field programmable gate array, a dedicated integrated chip, a system chip, a central processing unit, a network processor, a digital signal processing circuit, or a microcontroller for implementing the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal device or may be a circuit. The apparatus may be configured to perform an action performed by the terminal device in the foregoing method embodiments.

Figure 14:
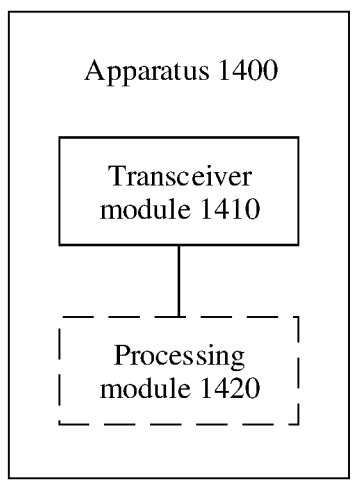
FIG. 14 is a schematic block diagram of a communication apparatus according to another embodiment of this application.

FIG. 14 is a schematic block diagram of a communication apparatus 1400 according to an embodiment of this application.

It should be understood that the apparatus 1400 may correspond to the terminal device in the embodiment shown in FIG. 5 or FIG. 8, or a chip in the terminal device, and may have any function of the terminal device in the method in FIG. 5 or FIG. 8. The apparatus 1400 includes a transceiver module 1410.

The transceiver module 1410 is configured to receive, from a master access network device, a first message, where the first message includes handover triggering condition information of one or more cells corresponding to at least one candidate secondary access network device.

The transceiver module 1410 is further configured to send a first response message to the master access network device, where the first response message is used to indicate a second cell corresponding to a second secondary access network device in the at least one candidate secondary access network device, and the second cell meets a handover triggering condition indicated by handover triggering condition information of the second cell.

Optionally, the apparatus 1400 may further include a processing module 1420. The processing module is configured to determine the second secondary access network device from the at least one candidate secondary access network device.

Optionally, handover triggering condition information of a first cell corresponding to the at least one candidate secondary access network device is used to indicate one or more of a valid time of the handover triggering condition information of the first cell, a handover triggering condition of the first cell, and a priority of the first cell, where the handover triggering condition of the first cell includes a measurement quality threshold for triggering the terminal device to be handed over to the first cell or a quality deviation threshold for triggering the terminal device to be handed over to the first cell, and a quality deviation includes a difference between measurement quality of a channel between the terminal device and a serving cell and measurement quality of a channel between the terminal device and the first cell.

Optionally, the first response message includes a cell identifier of the second cell.

Figure 15:
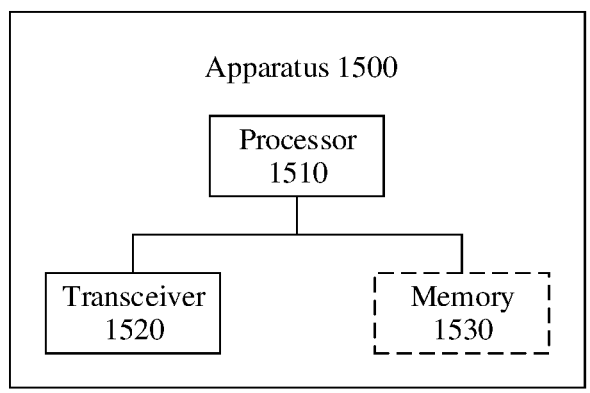
FIG. 15 is a schematic diagram of a structure of a communication apparatus according to an embodiment of this application.

FIG. 15 shows a communication apparatus 1500 according to an embodiment of this application. The apparatus 1500 may be the terminal device in FIG. 5 or FIG. 8. The apparatus may use a hardware architecture shown in FIG. 15. The apparatus may include a processor 1510 and a transceiver 1520. Optionally, the apparatus may further include a memory 1530. The processor 1510, the transceiver 1520, and the memory 1530 communicate with each other through an internal connection path. A related function implemented by the processing module 1420 in FIG. 14 may be implemented by the processor 1510, and a related function implemented by the transceiver module 1410 may be implemented by the processor 1510 by controlling the transceiver 1520.

Optionally, the processor 1510 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control a communication apparatus (for example, a base station, a terminal device, or a chip), execute a software program, and process data of the software program.

Optionally, the processor 1510 may include one or more processors, for example, include one or more central processing units (CPUs). When the processor is one CPU, the CPU may be a single-core CPU or a multi-core CPU.

The transceiver 1520 is configured to send data and/or a signal, and receive data and/or a signal. The transceiver may include a transmitter and a receiver. The transmitter is configured to send data and/or a signal, and the receiver is configured to receive data and/or a signal.

The memory 1530 includes but is not limited to a random access memory (random access memory, RAM), a read-only memory (ROM), an erasable programmable read-only memory (EPROM), and a compact disc read-only memory (CD-ROM). The memory 1530 is configured to store related instructions and data.

The memory 1530 is configured to store program code and data of the terminal device, and may be a separate device or integrated into the processor 1510.

Specifically, the processor 1510 is configured to control information transmission between the transceiver and the terminal device. For details, refer to the description in the foregoing method embodiments. Details are not described herein again.

During specific implementation, in an embodiment, the apparatus 1500 may further include an output device and an input device. The output device communicates with the processor 1510, and may display information in a plurality of manners. For example, the output device may be a liquid crystal display (LCD), a light emitting diode (LED) display device, a cathode ray tube (CRT) display device, a projector, or the like. The input device communicates with the processor 601, and may receive an input from a user in a plurality of manners. For example, the input device may be a mouse, a keyboard, a touchscreen device, or a sensor device.

It may be understood that FIG. 15 merely shows a simplified design of the communication apparatus. During actual application, the apparatus may further include other necessary components, including but not limited to any quantity of transceivers, processors, controllers, memories, and the like, and all terminal devices that can implement this application shall fall within the protection scope of this application.

In a possible design, the apparatus 1500 may be a chip, for example, may be a communication chip that can be used in the terminal device, and configured to implement a related function of the processor 1510 in the terminal device. The chip may be a field programmable gate array, a dedicated integrated chip, a system chip, a central processing unit, a network processor, a digital signal processing circuit, or a microcontroller for implementing the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal device or may be a circuit. The apparatus may be configured to perform an action performed by the terminal device in the foregoing method embodiments.

Figure 16:
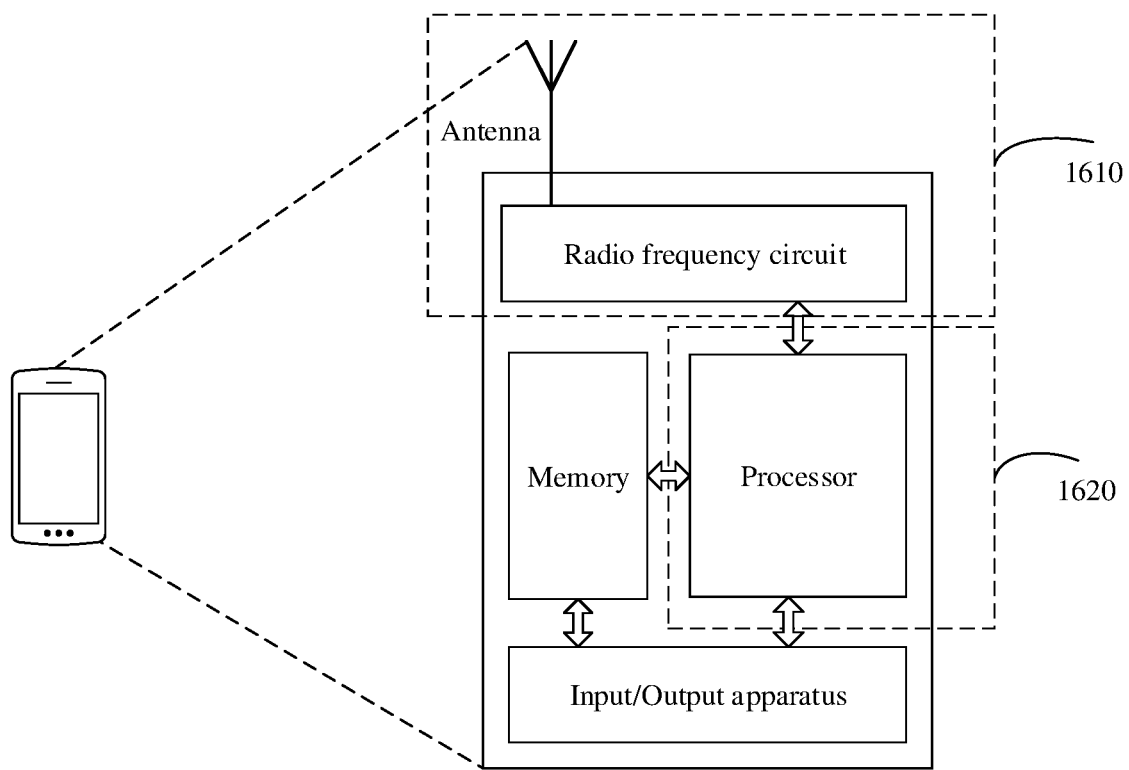
FIG. 16 is a schematic block diagram of a communication apparatus according to another embodiment of this application.

Optionally, when the apparatus in this embodiment is the terminal device, FIG. 16 is a simplified schematic diagram of a structure of a terminal device. For ease of understanding and ease of illustration, in FIG. 16, a mobile phone is used as an example of the terminal device. As shown in FIG. 16, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is configured to store the software program and the data. The radio frequency circuit is mainly configured to perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to receive data entered by a user, and output data to the user. It should be noted that some types of terminal devices may have no input/output apparatus.

When needing to send data, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data. For ease of description, only one memory and one processor are shown in FIG. 16. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the radio frequency circuit and the antenna that has receiving and sending functions may be considered as a transceiver unit of the terminal device, and the processor that has a processing function may be considered as a processing unit of the terminal device. As shown in FIG. 16, the terminal device includes a transceiver unit 1610 and a processing unit 1620. The transceiver unit may also be referred to as a transceiver, a transceiver machine, a transceiver apparatus, or the like. The processing unit may also be referred to as a processor, a processing board, a processing module, a processing apparatus, or the like. Optionally, in the transceiver unit 1610, a component configured to implement a receiving function may be considered as a receiving unit, and in the transceiver unit 1610, a component configured to implement a sending function may be considered as a sending unit. That is, the transceiver unit 1610 includes the receiving unit and the sending unit. The transceiver unit may also be sometimes referred to as a transceiver, a transceiver machine, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1610 is configured to perform a sending operation and a receiving operation on a terminal device side in the foregoing method embodiments, and the processing unit 1620 is configured to perform an operation other than the sending and receiving operations of the terminal device in the foregoing method embodiments.

For example, in an implementation, the processing unit 1620 is configured to perform processing steps on a terminal device side in FIG. 5 and FIG. 7 to FIG. 9A and FIG. 9B. The transceiver unit 1610 is configured to perform a sending/receiving operation in step 301 and/or step 302 in FIG. 5 and FIG. 7 to FIG. 9A and FIG. 9B, and/or the transceiver unit 1610 is further configured to perform another sending/receiving step on the terminal device side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 17:
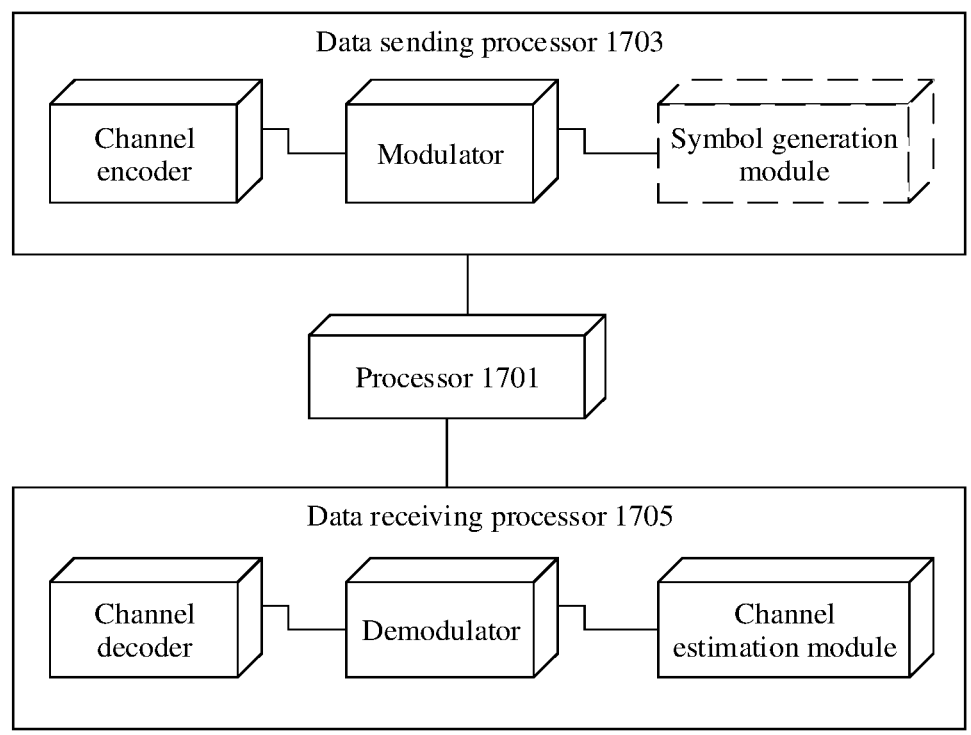
FIG. 17 is a schematic diagram of a structure of a communication apparatus according to an embodiment of this application.

Optionally, when the apparatus is a terminal device, further refer to a device shown in FIG. 17. For example, the device may complete a function similar to that of the processing unit 1620 in FIG. 16. In FIG. 17, the device includes a processor 1701, a data sending processor 1703, and a data receiving processor 1705. The processing module in the foregoing embodiment may be the processor 1701 in FIG. 17, and completes a corresponding function. The transceiver module in the foregoing embodiment may be the data sending processor 1703 and the data receiving processor 1705 in FIG. 17. Although a channel encoder and a channel decoder are shown in FIG. 17, it may be understood that these modules are not intended to constitute limitative description of this embodiment and are merely examples.

Figure 18:
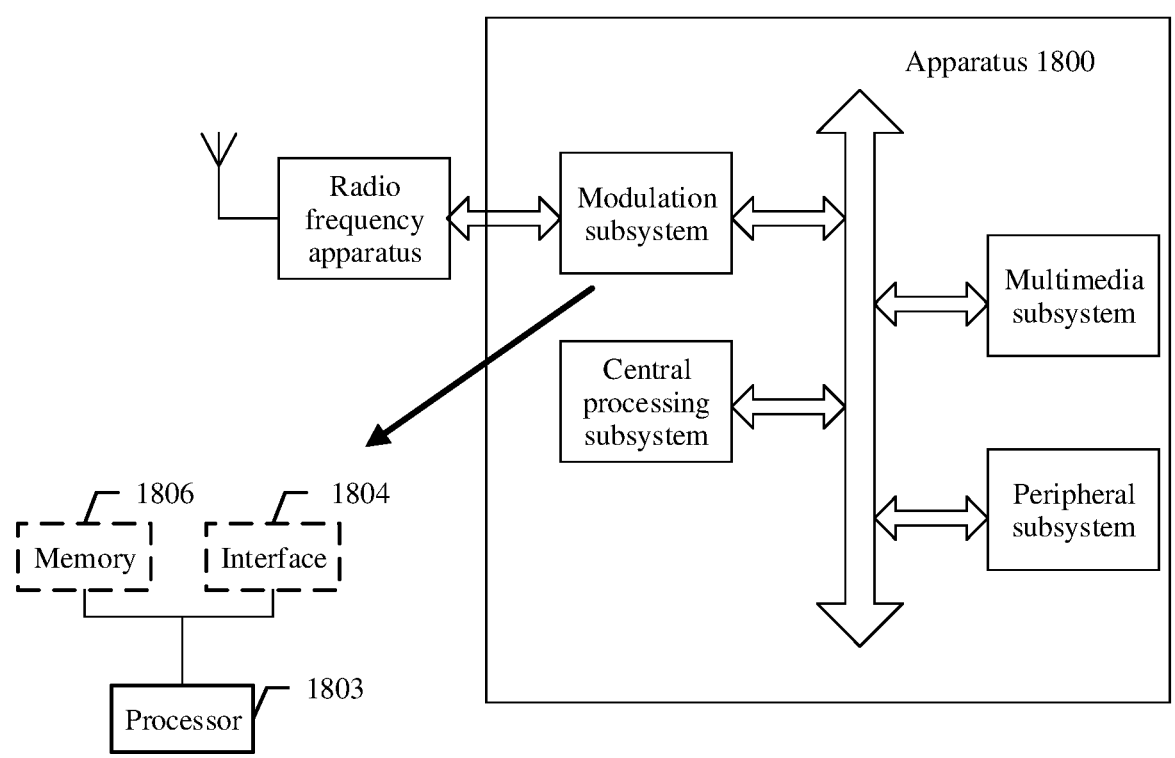
FIG. 18 is a schematic diagram of a structure of a communication apparatus according to another embodiment of this application.

FIG. 18 shows another form of an apparatus in this embodiment. The apparatus 1800 includes modules such as a modulation subsystem, a central processing subsystem, and a peripheral subsystem. A communication device in this embodiment may be used as the modulation subsystem in the apparatus. Specifically, the modulation subsystem may include a processor 1803 and an interface 1804. The processor 1803 completes a function of the foregoing processing module, and the interface 1804 completes a function of the foregoing transceiver module. In another variant, the modulation subsystem includes a memory 1806, the processor 1803, and a program that is stored in the memory and that can be run on the processor. When executing the program, the processor implements the method according to one of Embodiment 1 to Embodiment 5. It should be noted that the memory 1806 may be nonvolatile or volatile. The memory 1806 may be located in the modulation subsystem, or may be located in the apparatus 1800, provided that the memory 1806 can be connected to the processor 1803.

Figure 19:
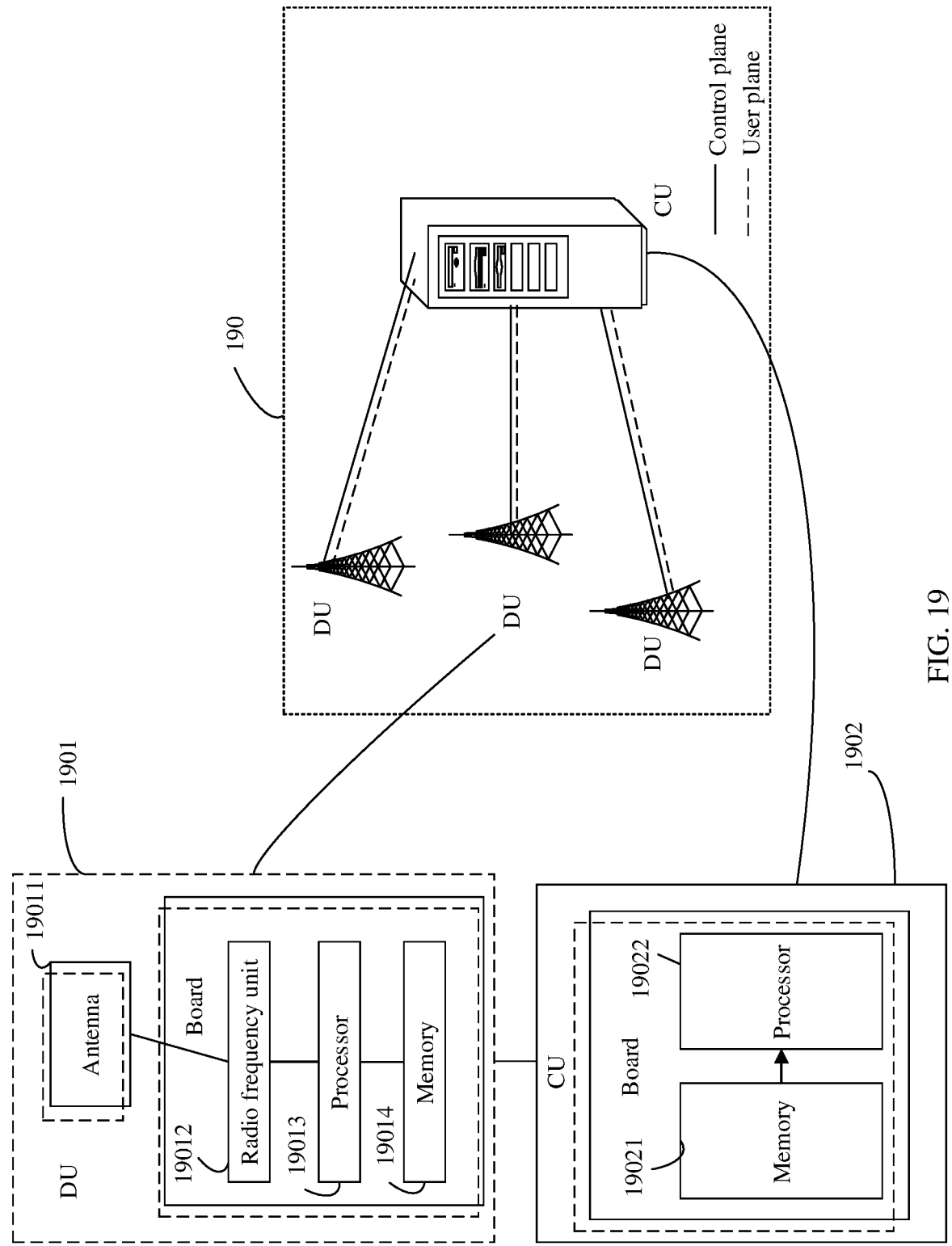
FIG. 19 is a schematic diagram of a structure of a communication apparatus according to another embodiment of this application.

When an apparatus in this embodiment is an access network device, the access network device may be shown in FIG. 19. For example, the apparatus 190 is a base station. The base station may be used in the systems shown in FIG. 1 to FIG. 3, and performs functions of the master access network device or the secondary access network device in the foregoing method embodiments. The base station 190 may include one or more DUs 1901 and one or more CUs 1902. The CU 1902 may communicate with a next-generation core (NG core, NC). The DU 1901 may include at least one antenna 19011, at least one radio frequency unit 19012, at least one processor 19013, and at least one memory 19014. The DU 1901 is mainly configured to receive and send a radio frequency signal, convert a radio frequency signal and a baseband signal, and perform some baseband processing. The CU 1902 may include at least one processor 19022 and at least one memory 19021. The CU 1902 and the DU 1901 may communicate by using an interface. A control plane interface may be an Fs-C, for example, F1-C, and a user plane interface may be an Fs-U, for example, F1-U.

The CU 1902 is mainly configured to perform baseband processing, control the base station, and the like. The DU 1901 and the CU 1902 may be physically disposed together, or may be physically disposed separately, in other words, may be a distributed base station. The CU 1902 is a control center of the base station, may also be referred to as a processing unit, and is mainly configured to complete a baseband processing function. For example, the CU 1902 may be configured to control the base station to perform an operation procedure related to the access network device in the foregoing method embodiments.

Specifically, baseband processing on the CU and the DU may be divided based on protocol layers of a wireless network. For example, functions of a packet data convergence protocol (PDCP) layer and a protocol layer above the PDCP layer are set in the CU. Functions of protocol layers below the PDCP layer, such as a radio link control (RLC) layer and a media access control (MAC) layer, are set in the DU. For another example, the CU implements functions of a radio resource control (RRC) layer and a packet data convergence protocol (PDCP) layer. The DU implements functions of a radio link control (RLC) layer, a MAC layer, and a physical (PHY) layer.

In addition, optionally, the base station 190 may include one or more radio frequency units (RUs), one or more DUs, and one or more CUs. The DU may include at least one processor 19013 and at least one memory 19014, the RU may include at least one antenna 19011 and at least one radio frequency unit 19012, and the CU may include at least one processor 19022 and at least one memory 19021.

In an example, the CU 1902 may include one or more boards, and a plurality of boards may jointly support a radio access network (for example, a 5G network) of a single access standard, or may separately support radio access networks (such as an LTE network, a 5G network, or another network) of different access standards. The memory 19021 and the processor 19022 may serve one or more boards. In other words, a memory and a processor may be disposed on each board. Alternatively, a plurality of boards may share a same memory and a same processor. In addition, a necessary circuit may be further disposed on each board. The DU 1901 may include one or more boards, and a plurality of boards may jointly support a radio access network (for example, a 5G network) of a single access standard, or may separately support radio access networks (such as an LTE network, a 5G network, or another network) of different access standards. The memory 19014 and the processor 19013 may serve one or more boards. In other words, a memory and a processor may be disposed on each board. Alternatively, a plurality of boards may share a same memory and a same processor. In addition, a necessary circuit may be further disposed on each board.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (SSD)), or the like.

It should be understood that, the processor may be an integrated circuit chip, and has a signal processing capability. In an implementation process, steps in the foregoing method embodiments can be completed by using a hardware integrated logic circuit in the processor, or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (direct rambus RAM, DR RAM).

In this application, "at least one" means one or more, and "a plurality of" means two or more. The term "and/or" describes an association relationship for describing associated objects and represents that three relationships may exist. For example, A and/or B may indicate the following cases: A exists alone, both A and B exist, and B exists alone, where A and B may be singular or plural. The character "/" usually indicates an "or" relationship between the associated objects. The term "at least one of the following items (pieces)" or a similar expression thereof means any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of the present invention. Therefore, "in one embodiment" or "in an embodiment" appearing in the entire specification does not necessarily refer to a same embodiment. In addition, these particular features, structures, or characteristics may be combined in one or more embodiments in any proper manner. It should be understood that sequence numbers of the foregoing processes do not mean execution sequences in the embodiments of the present invention. The execution sequences of the processes should be determined based on functions and internal logic of the processes, and should not constitute any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate with each other by using a local and/or remote process and based on, for example, a signal having one or more data packets (for example, data from two components interacting with another component in a local system or a distributed system and/or across a network such as the internet interacting with other systems by using a signal).

It should be further understood that "first", "second", and various numerical symbols in this specification are merely used for distinguishing for ease of description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in the embodiments of this application. The foregoing storage medium includes any medium that can store program code, for example, a USB flash drive, a removable hard disk, a read-only memory (readROM), a random access memory (RAM), a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    obtaining, by a master access network device connected to a terminal device that is in a dual connectivity arrangement with the master access network device and a first secondary access network device, first handover triggering condition information of one or more cells corresponding to at least one candidate secondary access network device, wherein the first handover triggering condition information is obtained by the master access network device from the first secondary access network device, wherein the first handover triggering condition information indicates a handover triggering condition of the one or more cells;
    generating second handover triggering condition information by excluding handover triggering condition information that is in the first handover triggering condition information and that is of a cell corresponding to a secondary access network device that the master access network device is unsuccessful in adding;
    sending a first message to the terminal device, wherein the first message comprises the second handover triggering condition information; and
    receiving a first response message from the terminal device, wherein the first response message indicates a cell identifier of a second cell corresponding to a second secondary access network device in the at least one candidate secondary access network device, and the second cell meets a handover triggering condition indicated by handover triggering condition information of the second cell.

2. The method according to claim 1, further comprising:
    sending a second message to the first secondary access network device, wherein the second message indicates a status of adding a candidate secondary access network device by the master access network device.

3. The method according to claim 2, wherein the second message comprises at least one of:

acknowledgement information of a candidate secondary access network device successfully added by the master access network device; or information about a candidate secondary access network device unsuccessfully added by the master access network device.

4. The method according to claim 1, further comprising:
receiving, from the first secondary access network device, measurement quality information of the one or more cells corresponding to the at least one candidate secondary access network device; and
receiving configuration information of one or more cells corresponding to a first candidate access network device from a first candidate secondary access network device in the at least one candidate secondary access network device;
wherein the first message further comprises at least one of a cell identifier, configuration information, or the measurement quality information of the one or more cells corresponding to the at least one candidate secondary access network device.

5. The method according to claim 4, further comprising performing, before configuration information of a first cell of the one or more cells is received:
sending a first request to the first candidate secondary access network device, wherein the first request requests the configuration information configured by the first candidate secondary access network device for the terminal device.

6. The method according to claim 1, wherein the second handover triggering condition comprises at least one of:
a measurement quality threshold for triggering the terminal device to be handed over to a first cell; or
a quality deviation threshold for triggering the terminal device to be handed over to the first cell, and wherein a quality deviation comprises a difference between measurement quality of a channel between the terminal device and a serving cell and measurement quality of a channel between the terminal device and the first cell.

7. A communication method, comprising:
determining, by a first secondary access network device, first handover triggering condition information of one or more cells corresponding to at least one candidate secondary access network device, wherein the first handover triggering condition information indicates a handover triggering condition of the one or more cells;
sending the first handover triggering condition information from the first secondary access network device to a master access network device connected to a terminal device that is in a dual connectivity arrangement with the master access network device and the first secondary access network device, wherein sending the first handover triggering condition information to the master access network device causes the master access network device to send second handover triggering condition information to the terminal device, and wherein the second handover triggering condition information includes at least a portion of the first handover triggering condition information and excludes handover triggering condition information that is in the first handover triggering condition information and that is of a cell corresponding to a secondary access network device that the master access network device is unsuccessful in adding; and
receiving a second message from the master access network device, wherein the second message indicates a status of adding the at least one candidate secondary access network device by the master access network device.

8. The method according to claim 7, wherein the first handover triggering condition comprises at least one of:
a measurement quality threshold for triggering the terminal device to be handed over to a first cell; or
a quality deviation threshold for triggering the terminal device to be handed over to the first cell, and wherein a quality deviation comprises a difference between measurement quality of a channel between the terminal device and a serving cell and measurement quality of a channel between the terminal device and the first cell.

9. The method according to claim 7, further comprising:
sending, to the master access network device, measurement quality information of the one or more cells corresponding to the at least one candidate secondary access network device.

10. A communication method, comprising:
receiving, by a terminal device that is in a dual connectivity arrangement with a master access network device and a first secondary access network device, from the master access network device, a first message, wherein the first message comprises second handover triggering condition information of one or more cells corresponding to at least one candidate secondary access network device, wherein the second handover triggering condition information indicates a handover triggering condition of the one or more cells, wherein the first message is received from the master access network device in response to first handover triggering condition information being obtained by the master access network device from the first secondary access network device, wherein the second handover triggering condition information includes at least a portion of the first handover triggering condition information and excludes handover triggering condition information that is in the first handover triggering condition information and that is of a cell corresponding to a secondary access network device that the master access network device is unsuccessful in adding; and
sending a first response message to the master access network device, wherein the first response message indicates a second cell corresponding to the second secondary access network device in the at least one candidate secondary access network device, and wherein the second cell meets a handover triggering condition indicated by handover triggering condition information of the second cell.

11. The method according to claim 10, wherein the handover triggering condition of the second cell comprises at least one of:
a measurement quality threshold for triggering the terminal device to be handed over to the second cell; or
a quality deviation threshold for triggering the terminal device to be handed over to the second cell, and wherein a quality deviation comprises a difference between measurement quality of a channel between the terminal device and a serving cell and measurement quality of a channel between the terminal device and the second cell.

12. A communication apparatus, comprising:
a transceiver;
a processor; and
a non-transitory computer readable medium connected to the processor and storing a program for execution by the processor, the program including instructions to:

obtain first handover triggering condition information of one or more cells corresponding to at least one candidate secondary access network device, wherein the communication apparatus is connected to a terminal device that is in a dual connectivity arrangement with the communication apparatus and a first secondary access network device when the first handover triggering condition information is obtained, wherein the communication apparatus is a master access network device, a chip of the master access network device, or a chip system of the master access network device, wherein the first handover triggering condition information is obtained by the master access network device from the first secondary access network device, wherein the first handover triggering condition information indicates a handover triggering condition of the one or more cells;

generate second handover triggering condition information by excluding handover triggering condition information that is in the first handover triggering condition information and that is of a cell corresponding to a secondary access network device that the master access network device is unsuccessful in adding;

cause the transceiver to send a first message to the terminal device, wherein the first message comprises the second handover triggering condition information; and receive, through the receiver, a first response message from the terminal device, wherein the first response message indicates a cell identifier of a second cell corresponding to a second secondary access network device in the at least one candidate secondary access network device, and wherein the second cell meets a handover triggering condition indicated by handover triggering condition information of the second cell.

13. The communication apparatus according to claim 12, wherein the program further includes instructions to:
cause the transceiver to send a second message to the first secondary access network device, wherein the second message indicates a status of adding a candidate secondary access network device by the communication apparatus.

14. The communication apparatus according to claim 13, wherein the second message comprises at least one of:
acknowledgement information of a candidate secondary access network device successfully added by the communication apparatus; or
information about a candidate secondary access network device unsuccessfully added by the communication apparatus.

15. The communication apparatus according to claim 12, wherein the program further includes instructions to:
receive, from the first secondary access network device, through the receiver, measurement quality information of the one or more cells corresponding to the at least one candidate secondary access network device;
receive, through the receiver, configuration information of one or more cells corresponding to a first candidate access network device from a first candidate secondary access network device in the at least one candidate secondary access network device; and
cause the transceiver to send the first message to the terminal device, wherein the first message further comprises at least one of a cell identifier, configuration information, or the measurement quality information of the one or more cells corresponding to the at least one candidate secondary access network device.

16. The communication apparatus according to claim 15, wherein the program further includes instructions to:
cause the transceiver to send a first request to the first candidate secondary access network device, wherein the first request requests the configuration information configured by the first candidate secondary access network device for the terminal device.

17. The communication apparatus according to claim 12, wherein the handover triggering condition of the second cell comprises at least one of:
a measurement quality threshold for triggering the terminal device to be handed over to the second cell; or
a quality deviation threshold for triggering the terminal device to be handed over to the second cell, and wherein a quality deviation comprises a difference between measurement quality of a channel between the terminal device and a serving cell and measurement quality of a channel between the terminal device and the second cell.

\* \* \* \* \*